(12) United States Patent
Stanley et al.

(10) Patent No.: US 12,371,133 B1
(45) Date of Patent: Jul. 29, 2025

(54) DEPLOYABLE GALLEY

(71) Applicant: Cobalt Boats, LLC, Neodesha, KS (US)

(72) Inventors: Shane Stanley, Independence, KS (US); Michael Jason Turner, Bartlesville, OK (US); Timothy Wayne Kaiser, Independence, KS (US); Matthew Lee Welton, Sarasota, FL (US); Dillon Jack Majoros, Baltimore, MD (US); Nicolas Ballesteros Velasco, Independence, KS (US)

(73) Assignee: Cobalt Boats, LLC, Neodesha, KS (US)

( * ) Notice: Subject to any disclaimer, the term of this patent is extended or adjusted under 35 U.S.C. 154(b) by 537 days.

(21) Appl. No.: 17/735,857

(22) Filed: May 3, 2022

Related U.S. Application Data

(60) Provisional application No. 63/201,559, filed on May 4, 2021.

(51) Int. Cl.
| | | |
|---|---|---|
| *B63B 29/02* | (2006.01) | |
| *B60P 3/36* | (2006.01) | |
| *B63B 29/04* | (2006.01) | |

(52) U.S. Cl.
CPC .............. *B63B 29/02* (2013.01); *B60P 3/36* (2013.01); *B63B 2029/043* (2013.01)

(58) Field of Classification Search
CPC ... B63B 29/02; B63B 2029/043; B63B 29/22; B60P 3/36; E03C 2201/90
See application file for complete search history.

(56) References Cited

U.S. PATENT DOCUMENTS

| | | | | |
|---|---|---|---|---|
| 2,527,407 A | * | 10/1950 | Dunn ................. | A47B 77/12 |
| | | | | 312/272.5 |
| 2,812,227 A | * | 11/1957 | Hill .................... | A47B 69/00 |
| | | | | 297/188.1 |
| 4,022,137 A | * | 5/1977 | Chiu .................. | E05G 1/00 |
| | | | | 137/384.4 |
| 4,040,693 A | * | 8/1977 | Peterson ............. | A47B 85/00 |
| | | | | 312/236 |
| 4,082,391 A | | 4/1978 | Turner | |
| 4,854,261 A | | 8/1989 | Goldsmith | |
| 5,497,724 A | | 3/1996 | Brown et al. | |
| 5,595,429 A | | 1/1997 | Kennedy | |
| 5,622,404 A | | 4/1997 | Menne | |
| 5,692,335 A | | 12/1997 | Magnuson | |
| 6,263,825 B1 | | 7/2001 | Davidson | |
| 6,886,490 B2 | | 5/2005 | Aubé et al. | |

(Continued)

OTHER PUBLICATIONS

Liftco, Inc., Swing Galley, https://liftcoinc.com/specialty, printed May 3, 2022, in 2 pages.

(Continued)

*Primary Examiner* — Andrew Polay
(74) *Attorney, Agent, or Firm* — Knobbe, Martens, Olson & Bear, LLP

(57) ABSTRACT

A galley unit for a watercraft. The galley unit can be stowed in a base and covered by a seat covering to provide additional seating. The galley unit can be vertically deployed out of the base and uncovered for use. The galley unit can include a refrigerator, cooler, trash receptacle, stove, sink, microwave, oven, storage space, cutting surface, dishwasher, freezer, and/or other features.

25 Claims, 26 Drawing Sheets

(56) References Cited

U.S. PATENT DOCUMENTS

| | | |
|---|---|---|
| 8,844,458 B2 | 9/2014 | Foss et al. |
| D812,544 S | 3/2018 | Potts, I et al. |
| 10,375,945 B2 | 8/2019 | Potts |
| 10,850,809 B2 | 12/2020 | Potts, I et al. |
| 2006/0192468 A1* | 8/2006 | Gardner ................. A47B 77/04 312/236 |
| 2021/0039752 A1 | 2/2021 | Potts, I et al. |

OTHER PUBLICATIONS

Makro, srl, Bathroom Concepts, Hidden Washbasins, https://makro.it/en/portfolio-item/hidden/, printed May 3, 2022, in 4 pages.

Richelieu, Pull-out Tables and Sliding Island Tops, https://www.richelieu.com/documents/docsGr/120/364/6/1203646/1458011.pdf, version 4, dated Dec. 9, 2018, in 12 pages.

Scout Boats, Inc., 380 LXF Photo Gallery, https://www.scoutboats.com/model/380-lxf/photo-gallery/, printed May 3, 2022, in 7 pages.

\* cited by examiner

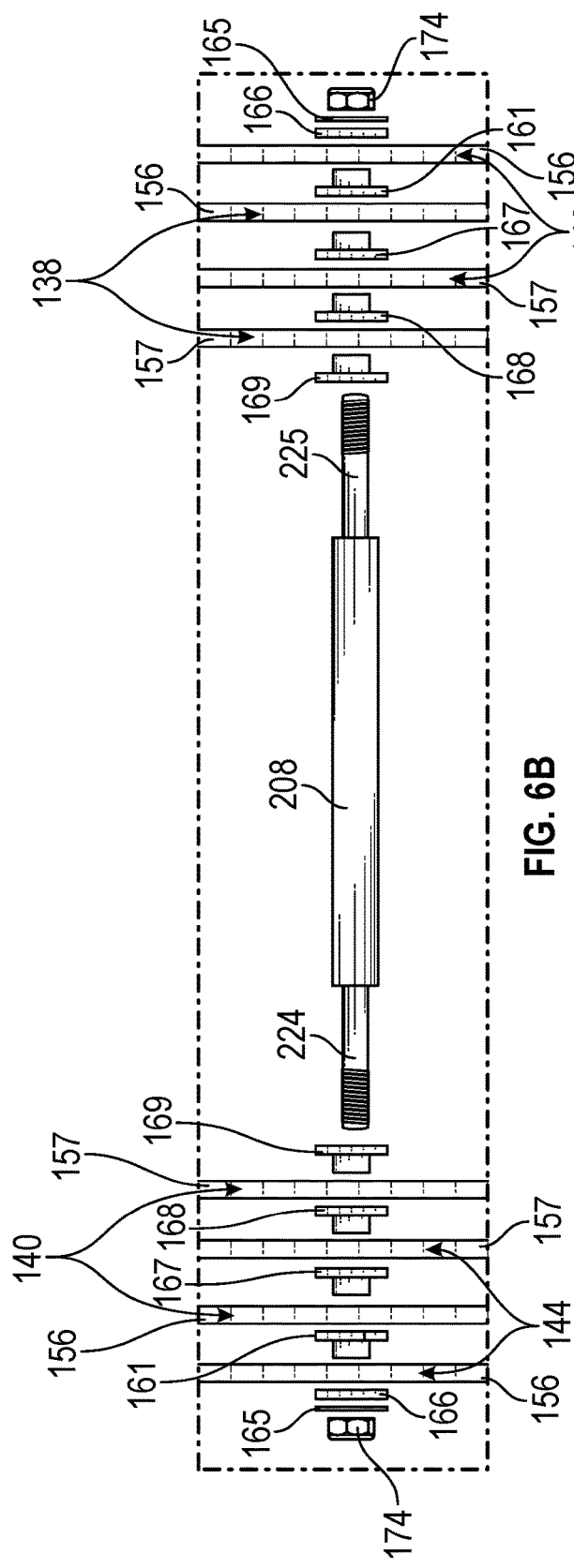
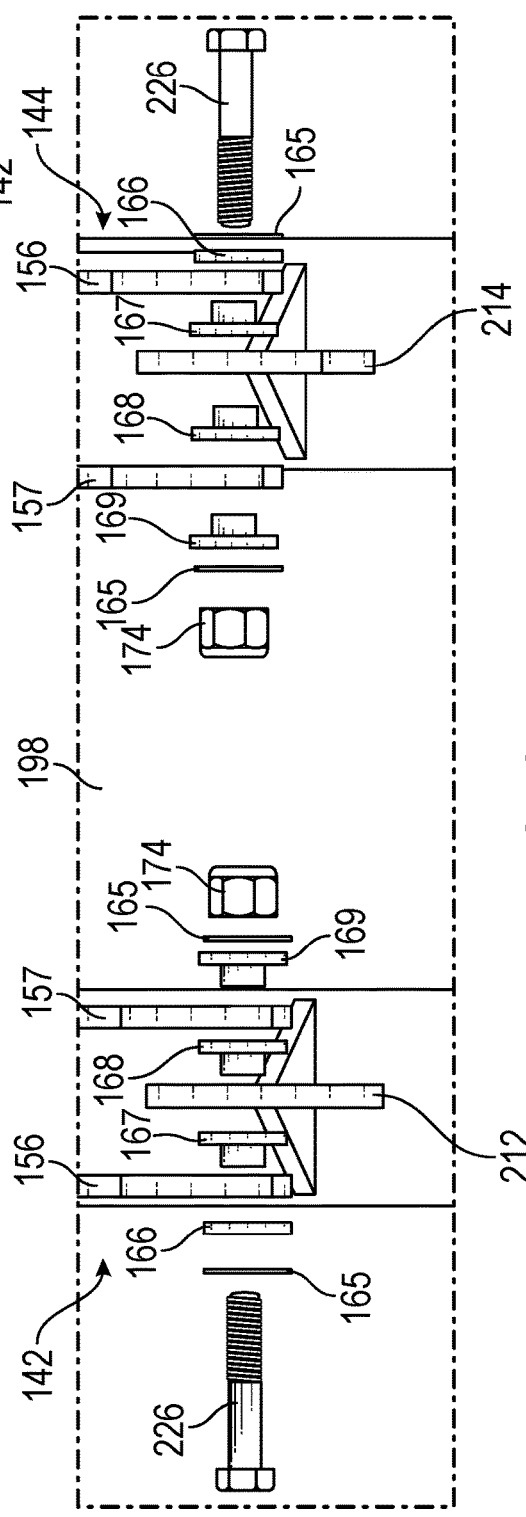
FIG. 6B
FIG. 6C

DEPLOYABLE GALLEY

CROSS REFERENCE TO RELATED APPLICATIONS

This application claims priority to U.S. Provisional Patent Application No. 63/201,559, filed May 4, 2021, which is incorporated herein by reference in its entirety. Any and all applications, if any, for which a foreign or domestic priority claim is identified in the Application Data Sheet of the present application is hereby incorporated by reference under 37 CFR 1.57.

FIELD

The present application relates generally to improving galleys for a watercraft and, more particularly, a galley that can be stowed and deployed.

BACKGROUND

Watercraft users are often out on the water for extended periods of time. In many instances, users want to eat or drink while remaining out. Accordingly, some watercraft are equipped with a galley to store or prepare food and drink.

SUMMARY

There are challenges associated with having a galley on a watercraft. For example, deck space is limited, and the addition of a galley further reduces deck space and/or seating. Accordingly, some galleys can be rotated in and out of a stowed position, but the rotational deployment or stowage of the galley still overly limits deck space during deployment/stowage and/or when deployed.

Disclosed herein are galley units that can be vertically deployed and stowed. The galley units can be stowed within a base and/or frame when not in use. A seat covering or cushion can cover a top portion of the galley unit such that a user may comfortably sit thereon, providing more seating options. The galley units can be disposed on a recreational vehicle, such as a boat, camper, trailer, etc. The galley units can be installed in other environments, which can at least include an apartment, condo, house, etc.

The galley units can be vertically deployed straight up and out of the base for use and vertically stowed straight down and into the base for stowage. The straight vertical deployment/stowage can eliminate the portion of the deck space that would otherwise be occupied with rotational deployment/stowage. For example, a galley unit that is rotated in and out of stowage will extend out over more of the deck space compared to a galley unit that is vertically deployed. The vertical deployment may, in some instances, not occupy deck space beyond the periphery of the base. The galley unit can be vertically deployed with an actuator (e.g., linear actuator), which can include a motor(s) (e.g., electric, pneumatic, etc.), worm gear(s), scissor hinge(s), scissor lift(s), rack(s) and pinion gear(s), lifting chain(s), jack(s), spring(s), one or more linkages, lever(s), lift(s), hydraulic lift(s), pneumatic lift(s), electric lift(s), and/or other mechanism(s). When deployed, the seat covering or cushion can be removed to expose features of the galley unit for use. The galley unit may include a sink(s), faucet(s), stove(s), trash receptacle(s), microwave(s), oven(s), dishwasher(s), storage space(s), cutting surface(s), display(s), speaker(s), light source(s), user interface(s), and/or other features. In some configurations, the galley unit can be vertically deployed and/or stowed manually.

In some instances, the galley unit may include a refrigerator(s), freezer(s), and/or cooler(s). The refrigerator(s), freezer(s), and/or cooler(s) may be positioned within a second base, or the same base as the galley unit, that can be covered with a second seat cushion or covering such that the user may comfortably sit thereon. The second seat cushion or covering can be removed to access the refrigerator(s), freezer(s), and/or cooler(s). The refrigerator(s), freezer(s), and/or cooler(s) can be top accessible. In some variants, the refrigerator(s), freezer(s), and/or cooler(s) can be vertically deployed from and stowed into the second base.

Various embodiments of a deployable galley are described herein. In some aspects, a deployable galley unit for a boat is described herein. The galley unit can include a housing that can be stowed within and vertically deployed out of a frame disposed on a deck of a boat. The housing can include one or more features for preparing consumables. The galley unit can include a seat covering that can cover a top portion of the housing such that a user can sit on the housing when stowed within the frame. The galley unit can include a scissor lift assembly that can include a plurality of arms rotatably coupled to each other and a linear actuator having a shaft. The plurality of arms can include a first arm, a second arm, a third arm, and a fourth arm. The first and the second arms can be rotatably coupled to the frame and slidably coupled to the housing. The third and the fourth arms can be rotatably coupled to the housing and slidably coupled to the frame. The shaft of the linear actuator can be coupled to ends of the third and the fourth arms that are slidably coupled to the frame such that an extension or retraction of the shaft causes the scissor lift assembly to vertically lower the housing straight down into the frame or vertically raise the housing straight out of the frame.

In some configurations, the galley unit can include a carriage and a vertically-oriented track having one or more rails. The carriage can be coupled to the housing and slidably coupled to the rails of the track. The track can be coupled to the frame.

In some configurations, the frame can include one or more posts that can support the housing in the stowed configuration.

In some configurations, the galley unit can include a tray that can hold a hose for supplying fluid to a spout. The tray can be pivotably coupled to the frame and slidably coupled to the housing.

In some configurations, each of the plurality of arms can include a first arm member and a second arm member.

In some configurations, the galley unit can include a cross support that can be rotatably coupled to middle portions of the plurality of arms.

In some configurations, the galley unit can include a second cross support rotatably coupled to bottom portions of the third and the fourth arms. The shaft can be coupled to the second cross support.

In some configurations, the second cross support can include a first shaft and a second shaft. The first shaft can include a flange. The second shaft can include a pair of flanges with a gap therebetween. The flange of the first shaft can be placed in the gap between the pair of flanges of the second shaft.

In some configurations, the galley unit can include a third cross support that can be coupled to top portions of the first and the second arms.

In some configurations, an underside of the seat covering can include a surface that can reflect heat.

In some configurations, the actuator can be rotatably coupled to the frame.

In some configurations, the actuator can be controlled by a momentary switch.

In some configurations, the galley unit can include a stove that can be disposed on a top portion of the housing.

In some configurations, a deployable galley unit for a boat is described herein. The galley unit can include a housing that can be stowed within and vertically deployed out of a frame disposed on a deck of a boat. The galley unit can include a scissor lift assembly that can include a plurality of arms that can be rotatably coupled to each other and a linear actuator having a shaft coupled to at least one of the plurality of arms. The plurality of arms can be arranged in a crossed arrangement. A retraction of the shaft can cause ends of the plurality of arms to move closer together to vertically raise the housing out of the frame.

In some configurations, the galley unit can include a seat covering that can cover a top portion of the housing such that a user can sit on the housing when stowed within the frame.

In some configurations, the galley unit can include a carriage and a vertically-oriented track having one or more rails. The carriage can be coupled to the housing and slidably coupled to the rails of the track. The track can be coupled to the frame.

In some configurations, the plurality of arms can include a first arm, a second arm, a third arm, and a fourth arm. The first and the second arms can be rotatably coupled to the frame and slidably coupled to the housing. The third and the fourth arms can be rotatably coupled to the housing and slidably coupled to the frame.

In some configurations, the housing can include rails and the frame can include rails. The first and second arms can be slidably coupled to the rails of the housing. The third and fourth arms can be slidably coupled to the rails of the frame.

In some configurations, a deployable galley unit is described herein. The galley unit can include a housing that can be stowed within a base. The galley unit can include a seat covering that can cover a top portion of the housing such that a user can sit on the housing when stowed within the base. The galley unit can include an actuator that can vertically deploy the housing straight up out of the base.

In some configurations, the galley unit can include a scissor lift that can be manipulated by the actuator to move the housing between a stowed configuration and a deployed configuration.

In some configurations, the deployable galley unit can be disposed on a recreational vehicle.

In some configurations, the recreational vehicle can be a boat.

In some configurations, the recreational vehicle can be a camper.

In some configurations, the galley unit can include a spout and a fluid conduit fluidically coupled to the spout. The fluid conduit can include a slack section that can be tightened as the housing is deployed.

In some configurations, the fluid conduit can be a first fluid conduit and the galley unit can include a second fluid conduit. The second fluid conduit can be fluidically coupled to a sink to drain fluids from the sink.

In some configurations, the galley unit can include a heating element and a conduit that can power the heating element. The conduit can include a slack section that can be tightened as the housing is deployed.

In some aspects, the deployable galley unit can include a housing that can be stowed within a base. The deployable galley unit can include a seat covering that can cover a top portion of the housing such that a user can sit on the housing when stowed within the base. The deployable galley can include an actuator (e.g., a linear actuator) that can vertically deploy the housing straight up out of the base.

In some variants, the galley unit can include a sink.

In some variants, the galley unit can include a stove.

In some variants, the galley unit can include a trash receptacle.

In some variants, the galley unit can include a microwave.

In some variants, the galley unit can include a cover that can be manipulated to provide access into a storage space.

In some variants, the galley unit can include a refrigerator.

In some variants, the refrigerator can be disposed in a second base and covered by a second seat covering such that the user can sit on the refrigerator within the second base.

In some variants, the refrigerator can be top accessible.

In some variants, the galley unit can include a cooler.

In some variants, the cooler can be disposed in a second base and covered by a second seat covering such that the user can sit on the cooler within the second base.

In some variants, the cooler can be top accessible.

In some variants, the seat covering can be rotated to uncover the top portion of the housing.

In some variants, the seat covering can be rotatably coupled to the housing, enabling the seat covering to be rotated to uncover the top portion of the housing In some variants, the galley unit can include a trim ring disposed on an inner periphery of the base defining an opening therein, the trim ring can be in contact with an outer periphery of the housing.

In some variants, the linear actuator can include a scissor hinge.

In some variants, the linear actuator can include a scissor lift.

In some variants, the linear actuator can include an electric motor.

BRIEF DESCRIPTION OF THE DRAWINGS

Various embodiments are depicted in the accompanying drawings for illustrative purposes and may not be drawn to scale, and should in no way be interpreted as limiting the scope of the embodiments. In addition, various features of different disclosed embodiments can be combined to form additional embodiments, which are part of this disclosure.

FIG. 6B illustrates an exploded view of the arms and other components that can couple to a first cross support of the scissor lift assembly FIG. 6C illustrates an exploded view of the components that can couple two arms of the scissor lift assembly to the platform.

DETAILED DESCRIPTION

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below.

Figure 1:
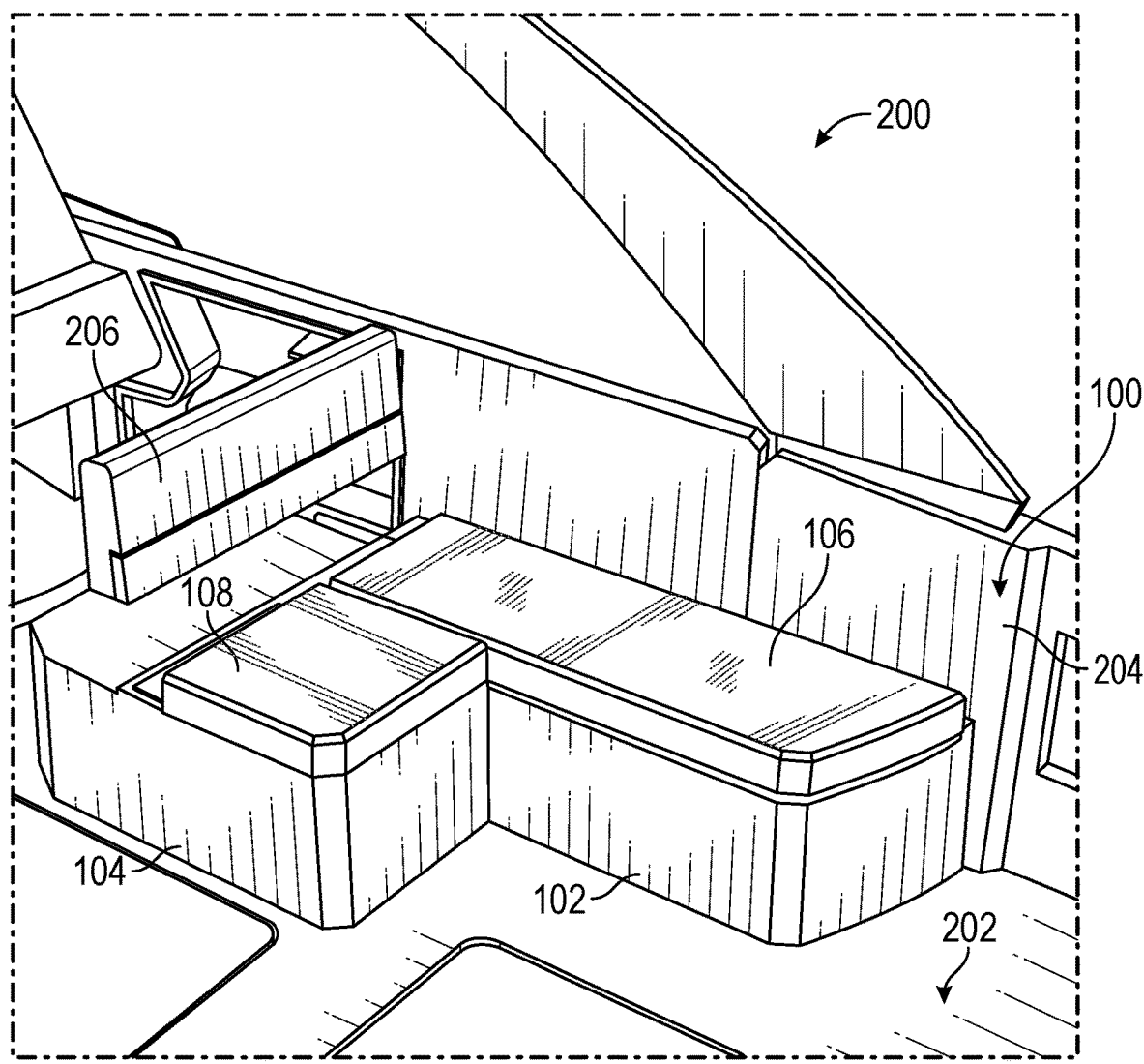
FIG. 1 illustrates a galley unit in a stowed configuration.

FIG. 1 illustrates an example galley unit 100, which can also be referred to as a hidden or pop-up galley. As illustrated, the galley unit 100 is in a stowed configuration. In the stowed configuration, users can sit on the galley unit 100 to provide more seating options. The galley unit 100 can be positioned anywhere on a watercraft 200 (e.g., boat) or in other environments (e.g., camper, RV, trailer, apartment, condo, house, etc.).

The galley unit 100 can be stowed within a base 102 and/or a base 104. The base 102 and/or base 104 can house the components of the galley unit 100 in the stowed configuration. The base 102 and/or base 104 can have a cavity to house components of the galley unit 100. The base 102 and/or base 104 can be disposed on a deck 202 of the watercraft 200. In some variants, a single base can house components of the galley unit 100 in the stowed configuration. In some variants, three or more bases can house components of the galley unit 100. In some variants, a portion of the galley unit 100 can be stowed at least partially below the deck of the watercraft 200 in the stowed configuration The galley unit 100 can have a seat cushion or covering 106 and/or seat cushion or covering 108 disposed thereon. The seat cushion 106 and/or seat cushion 108 can be disposed on the galley unit 100 in the stowed configuration such that a user can comfortably sit thereon to provide additional seating. The galley unit 100 can be disposed proximate a wall 204 and/or back rest 206 of the boat 200 to provide back support to a user sitting on the galley unit 100 in the stowed configuration.

Figure 2:
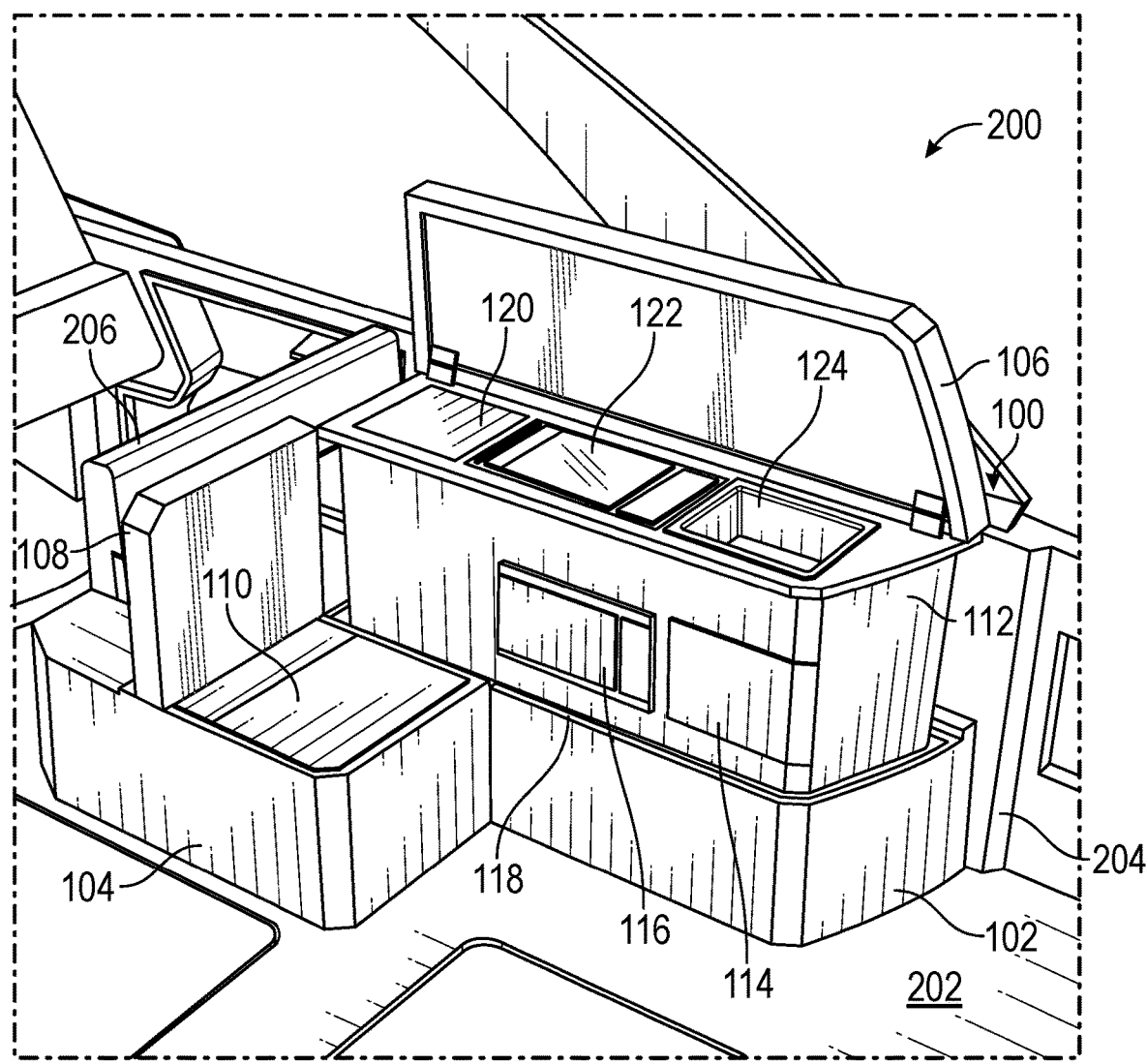
FIG. 2 illustrates the galley unit in a deployed configuration.

FIG. 2 illustrates the galley unit 100 in a deployed configuration. The galley unit 100 can deploy from within the base 102. The galley unit 100 can vertically deploy (e.g., rise) from within the base 102, which can include being vertically raised straight out of the base 102 and/or straight vertically relative to the deck 202. The galley unit 100 can deploy perpendicularly relative to the plane of the deck 202. The galley unit 100 can be deployed to one or more discrete positions (e.g., stowed and fully deployed) or along a continuum on positions to accommodate users of different heights. The vertical deployment of the galley unit 100 from within the base 102 can save deck space that may otherwise be occupied if the galley unit 100 were rotated out from a stowed configuration. The rotation out of the galley unit 100 can occupy more deck space (e.g., render more deck space unusable) compared to a vertical deployment. The galley unit 100, in the deployed configuration, can be raised to a height such that a user can comfortably stand and access different features of the galley unit 100. For example, a top surface of the galley unit 100 may be positioned 28 to 44 inches from the surface of the deck or floor when fully deployed.

The galley unit 100 can be vertically deployed (e.g., raised) and/or stowed by way of a variety of techniques. In some variants, the galley unit 100 can be vertically deployed and/or stowed manually and/or automatically. For example, a hand crank or lever can be used to manually deploy or stow the galley unit 100. In some variants, the galley unit 100 can be vertically raised and/or lowered with a motor (e.g., electric motor, pneumatic motor, etc.). In some variants, the galley unit 100 can be vertically raised and/or lowered with a pneumatic and/or hydraulic lift. The galley unit 100 can include a linear actuator to vertically maneuver between the stowed and the deployed configurations. In some variants, the linear actuator can include a motor(s), worm gear(s), scissor hinge(s), scissor lift(s), rack(s) and pinion gear(s), lifting chain(s), jack(s), spring(s), one or more linkages, lever(s), and/or other mechanism(s) to facilitate vertical movement of the galley unit 100.

The galley unit 100 can include a housing 112. The housing 112 can deploy from within the base 102, which can include being vertically deployed (e.g., vertically raised or lowered, vertically translated) as described herein. The housing 112 can be vertically maneuvered relative to the base 102. In some variants, the galley unit 100 may include a frame disposed inside the base 102, and the housing 112 may be vertically maneuvered relative to the fame. In some variants, the galley unit 100 can include one or more panels that can be deployed (e.g., folded out) to provide additional working space, which can at least include a cutting surface.

The galley unit 100 can include a storage space 114 (e.g., drawer, cabinet, etc.). The storage space 114 can be covered by a door. The storage space 114 can be disposed in the housing 112. In some variants, the storage space 114 can be disposed on a side and/or front face of the housing 112. The storage space 114 can be climate controlled and/or insulated. One or more items can be stowed in the storage space 114.

The galley unit 100 can include a microwave 116. The microwave 116 can be disposed in the housing 112. In some variants, the microwave 116 can be disposed on a side and/or front face of the housing 112. In some variants, the galley unit 100 can include an oven(s), dishwasher(s), cutting surface(s), speaker(s), display(s), light source(s), user interface(s), and/or other feature(s).

The galley unit 100 can include a sink 124. The sink 124 can be disposed on a top portion of the housing 112. In some variants, the sink 124 can include a spout (e.g., faucet) and/or drain. The spout can provide fluid, cold or hot, from a storage tank. The storage tank can be disposed in the housing 112, base 102, base 104, wall 204, and/or below the deck 202.

The galley unit 100 can include a stove 122. The stove 122 can be disposed on a top portion of the housing 112. The stove 122 can include one or more heating elements to heat food and/or drink.

The galley unit 100 can include a trash receptacle 120. The trash receptacle 120 can include a cover to enclose the trash receptacle 120. The trash receptacle 120 can be disposed on a top portion of the housing 112. A covering of the trash receptacle can be a cutting surface.

The seat covering or cushion 106 can be lifted to uncover a top of the galley unit 100 (e.g., housing 112), which can include the sink 124, stove 122, trash receptacle 120, and/or other features, including those described herein. In some variants, the seat cushion 106 can be rotatably coupled to the galley unit 100 (e.g., housing 112), such that the seat cushion 106 can be rotated to uncover the sink 124, stove 122, and/or trash receptacle 120. In some variants, the seat cushion 106 can be coupled to the galley unit 100 (e.g., housing 112) by way of one or more hinges. In some variants, the seat cushion 106 can include a rigid bottom panel to facilitate handling of the seat cushion 106. In some variants, the bottom surface of the seat cushion 106 can be liquid impermeable or resistant, enabling the bottom surface to function as a back splash. In some variants, the bottom of the seat cushion 106 or a panel attached to the bottom of the seat cushion 106 can include a surface that can reflect heat and/or be easily cleaned, such as stainless steel. In some variants, the seat cushion 106 can be coupled to the wall 204 and/or base 102 such that the seat cushion 106 can be rotated off the top of the galley unit 100 by deployment of the galley unit 100. In some variants, the seat cushion 106 is not coupled to the galley unit 100, wall 204, and/or base 102, enabling the seat cushion 106 to be completely removed to allow use and/or deployment of the galley unit 100.

The galley unit 100 can include a trim ring 118, which can also be referred to as a gasket. The trim ring 118 can surround an inner periphery defining an opening into the base 102. The trim ring 118 can be made of a polymer or other suitable material. The outer periphery of the housing 112 can contact the trim ring 118. The trim ring 118 can help to prevent liquid and/or other material from entering into the base 102. The outer periphery of the housing 112 can contact the trim ring 118 such that, even during deployment or stowage, liquid and/or other material can be prevented from entering into the base 102.

The galley unit 100 can include a refrigerator 110, which can be a top-accessible refrigerator. The refrigerator 110 can be disposed in the base 104. The seat covering or cushion 108 can be lifted to uncover the refrigerator 110 disposed in the base 104. In some variants, the seat cushion 108 can be rotated up to uncover the refrigerator 110. In some variants, the seat cushion 108 can be coupled to the base 104, which can include being coupled by way of a hinge to facilitate rotating the seat cushion 108 off of the base 104 to access the refrigerator 110. The refrigerator 110 can include a door or cover that can be located on top of the refrigerator 110 to facilitate top-access once the seat cushion 108 is removed. In some variants, the seat covering and door/cover are a single feature. The seat cushion 108 can include a rigid panel to facilitate handling. In some variants, the galley unit 100 can include a cooler in place of the refrigerator 110. In some variants, the galley unit 100 can include a freezer in place of the refrigerator 110. In some variants, the galley unit 100 can include a refrigerator 110, freezer, and/or a cooler. In some variants, the refrigerator 110, freezer, and/or cooler can be vertically deployed straight up out of the base 104 for access. In some variants, the refrigerator 110, freezer, and/or cooler can include a side door that can be opened to provide access into the refrigerator 110 after vertical deployment out of the base 104.

Figure 3A:
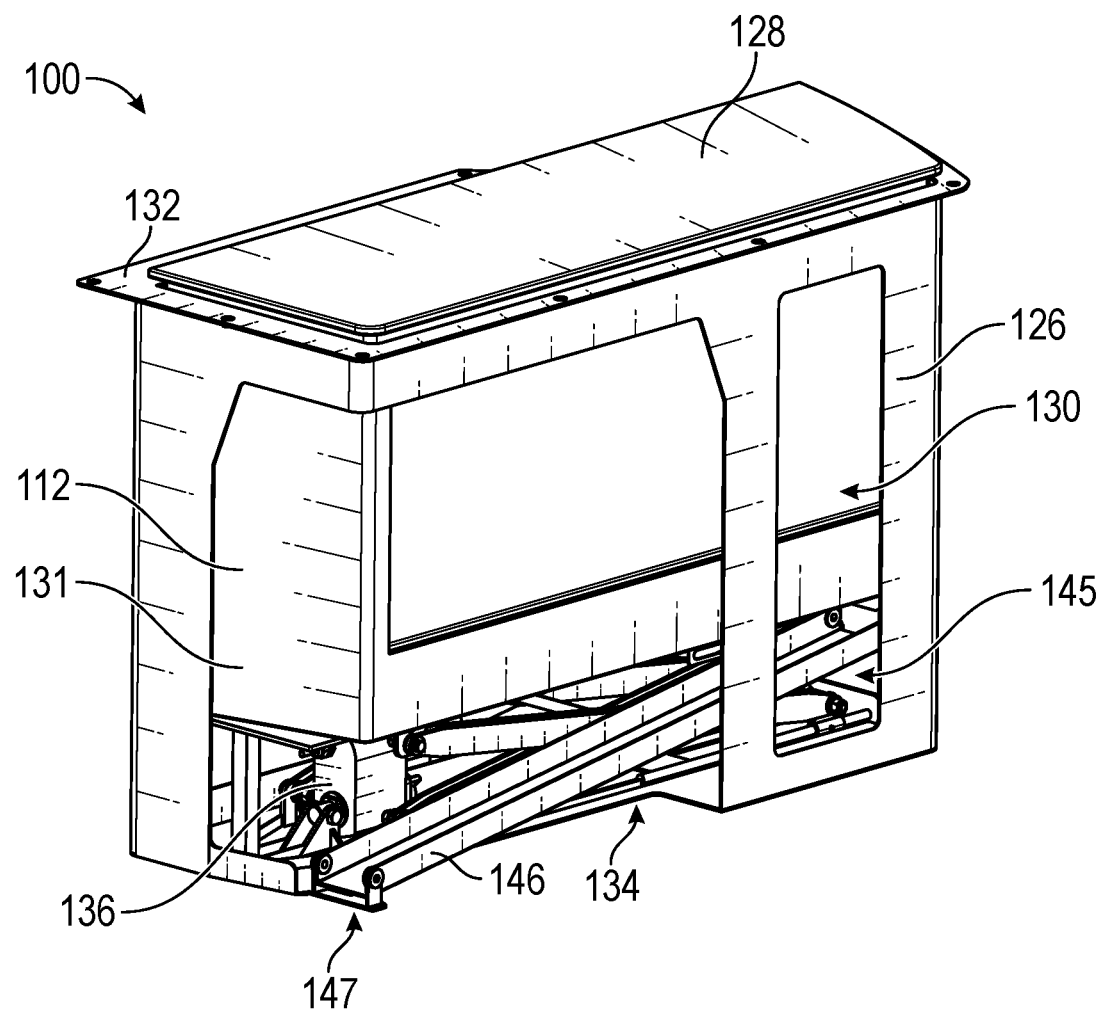
FIG. 3A illustrates the galley unit in the stowed configuration.
Figure 3B:
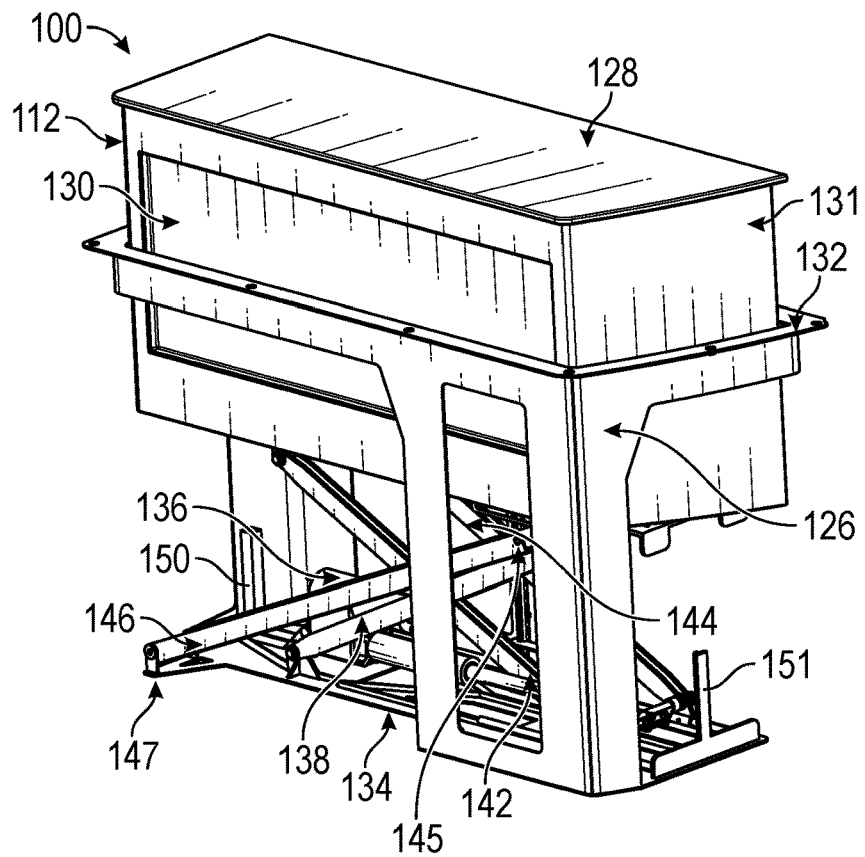
FIG. 3B illustrates the galley unit in an intermediate configuration between the stowed and the deployed configurations.
Figure 3C:
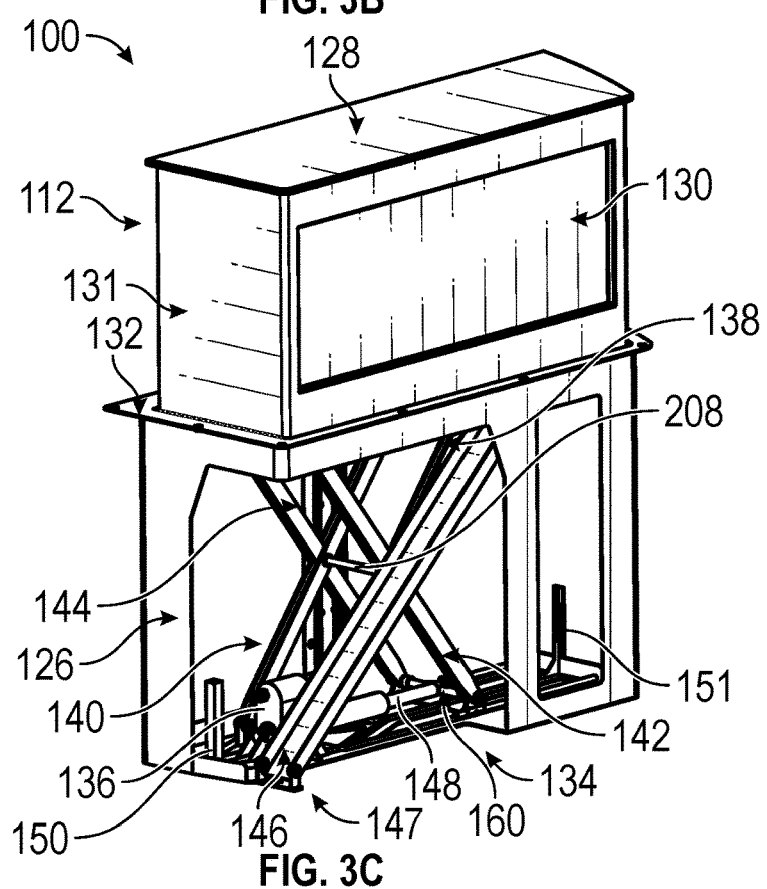
FIG. 3C illustrates the galley unit in the deployed configuration.

FIGS. 3A-3C illustrate the galley unit 100 in various configurations. In FIG. 3A, the galley unit 100 is shown in a stowed configuration. The galley unit 100 can include a frame 126. The frame 126 can include one or more openings, flanges, supports, and/or other features to facilitate the operation of the galley unit 100 as described herein. The frame 126 can be disposed inside of the base 102. In some configurations, the frame 126 can be integral to the base 102. The frame 126 can include a flange 132. The flange 132 can extend around a top portion of the frame 126. The flange 132 can be used to couple (e.g., bolt or otherwise fasten) the frame 126 to the base 102 and/or surrounding structures of the boat.

As described herein, the galley unit 100 can include a housing 112. The housing 112 can be stowed inside of the base 102 and be vertically deployed out from the base 102 as described herein. As illustrated in FIG. 3A, the housing 112 can be disposed within the frame 126 in the stowed configuration of the galley unit 100. During deployment or stowage, the housing 112 can be vertically maneuvered relative to the frame 126.

The housing 112 can include a front face 130. The front face 130 can include a recessed portion, which can be rectangular in shape. The housing 112 can include one or more side faces 131. One or more features can be disposed in the front face 130 and/or side face(s) 131, which can at least include a display(s), light(s), speaker(s), user interface(s), trash receptacle(s), microwave(s), oven(s), dishwasher(s), storage space(s), and/or other features. The foregoing features may, in some configurations, be not readily accessible with the galley unit 100 in the stowed configuration but readily accessible with the galley unit 100 in the deployed configuration.

The housing 112 can include a top 128, which can include a top surface. In some variants, the top 128 can be covered with a seat cushion, as described herein, to provide additional seating when the galley unit 100 is in the stowed configuration. The top 128 can include one or more features, which can at least include a sink(s), faucet(s), stove(s), trash receptacle(s), microwave(s), oven(s), dishwasher(s), storage space(s), cutting surface(s), display(s), speaker(s), light source(s), user interface(s), and/or other features.

The galley unit 100 can include a track 146, which can also be referred to as a tray or carrier. The track 146 can hold one or more wires, cables, and/or hoses to support one or more features of the galley unit 100. The track 146 can be rotatably coupled at a first end 147 (e.g., bottom end) to the frame 126, base 102, and/or surface of the boat. The track 146 can include a second end 145 (e.g., top end) that can be slidably coupled to a bottom surface of the housing 112 and/or a platform or other feature attached to the housing 112 such that, during vertical deployment or stowage, the second end 145 can slide to facilitate movement of the housing 112 while supporting the wires, cables, conduit(s), and/or fluid conduits (e.g., hoses). A fluid conduit (e.g., hose) supported by the track 146 can carry fluid to a spout of the galley unit 100. The fluid conduit can direct fluid stored in a tank in the base 102, in the wall 204, below deck, and/or in another location on the boat. A fluid conduit (e.g., hose) supported by the track 146 can carry gas to a heating element of the galley unit 100. A fluid conduit (e.g., hose) supported by the track 146 can carry gray water from a sink of the galley unit 100, via a drain, to a gray water tank or to another location. One or more wires and/or conduit to provide power to any of the features described herein can be supported by the track 146. In some configurations, the wire(s), conduit(s), cable(s), and/or fluid conduit(s) supported by the track 146 can include a slack section that is tightened as the housing 112 is deployed.

The galley unit 100 can include a scissor lift assembly 134. The scissor lift assembly 134 can vertically maneuver the housing 112 to move the galley unit 100 between the stowed and deployed configurations. The scissor lift assembly 134 can include an actuator 136, which can be a linear actuator. The actuator 136 can extend a shaft to move one or more arms of the scissor lift assembly 134 to raise or lower the housing 112.

FIG. 3B illustrates the galley unit 100 in an intermediate configuration, which can be between the stowed and deployed configurations. As illustrated, the scissor lift assembly 134 can raise the housing 112 out from within the frame 126, translating the housing 112 with respect to the frame 126. The scissor lift assembly 134 can lift the housing 112 off of a first post 150 and a second post 151 of the frame 126 that can support the housing 112 in the stowed configuration and/or prevent the scissor lift assembly 134 from being collapsed downward past a height. As described herein, in some configurations, the scissor lift assembly 134 can position the housing 112 along a continuum of positions to accommodate different user's heights and preferences. In some configurations, the preferred deployment position of a user can be saved such that the galley unit 100 can reassume a configuration. In some configurations, the scissor lift assembly 134 can position the housing 112 at discrete positions between the stowed and fully deployed configurations. In some configurations, the scissor lift assembly 134 only maneuvers between the stowed and fully deployed configurations.

FIG. 3C illustrates the galley unit 100 in a fully deployed configuration with the housing 112, or at least a significant portion thereof, deployed out from within the frame 126. As illustrated in FIG. 3C, the scissor lift assembly 134 can include a plurality of arms that can be maneuvered by the actuator 136 to raise or lower the housing 112. The plurality of arms can be arranged in a crossed arrangement. The plurality of arms can be parallel to each other. The plurality of arms can be pivotably coupled together. The plurality of arms can be pivotably and slidably coupled to the housing 112 and/or platform supporting the housing 112 and the frame 126 and/or surface of the boat. The ends of the plurality of arms can be moved closer together by the actuator 136 to raise the housing 112. The ends of the plurality of arms can be moved away from each other by the actuator 136 to lower the housing 112.

The plurality of arms can include an arm 138, arm 140, arm 142, and/or arm 144. In some configurations, the arm 138, arm 140, arm 142, and/or arm 144 can be the same size and/or shape. The arm 138 and arm 140 can be pivotably coupled to the frame 126 (e.g., bottom portion of the frame 126) or surface of the boat and slidably coupled to the bottom of the housing 112 and/or a platform or other feature attached to the housing 112. The lower ends of the arm 138 and arm 140 can be pivotably coupled to the frame 126 (e.g., bottom portion of the frame 126) and/or surface of the boat. The upper ends of the arm 138 and arm 140 can be slidably coupled to the bottom of the housing 112 and/or a platform or other feature attached to the housing 112. The arm 142 and arm 144 can be pivotably coupled to the bottom of the housing 112 and/or a platform or other feature attached to the housing 112 and slidably coupled to the frame 126 (e.g., bottom portion thereof) and/or surface of the boat. The lower ends of the arm 142 and arm 144 can be slidably coupled to the frame 126 (e.g., bottom portion thereof) and/or surface of the boat. The upper ends of the arm 142 and arm 144 can be rotatably coupled to the bottom of the housing 112 and/or a platform or other feature attached to the housing 112.

The scissor lift assembly 134 can include a first cross support 208, which can also be referred to as an axle, shaft, and/or pivot rod. The plurality of arms, which can include the arm 138, arm 140, arm 142, and/or arm 144, can be rotatably coupled to the first cross support 208. The first cross support 208 can extend through a middle portion of the arm 138, arm 140, arm 142, and/or arm 144. The arm 138 and arm 142 can be disposed at one end portion of the first cross support 208. The arm 140 and arm 144 can be disposed at another end portion of the first cross support 208 opposite the arm 138 and the arm 142. The plurality of arms, which can include the arm 138, arm 140, arm 142, and/or arm 144, can rotate about the first cross support 208.

The scissor lift assembly 134 can include a second cross support 160, which can also be referred to as a shaft or rod. The second cross support 160 can be coupled (e.g., rotatably coupled) to the arm 142 and arm 144. The second cross support 160 can be coupled to lower ends of the arm 142 and arm 144. The arm 142 can be disposed a first end portion of the second cross support 160. The arm 144 can be disposed on a second end portion, opposite the first end portion, of the second cross support 160.

The actuator 136 can include a shaft 148, which can also be referred to as an arm or member. The shaft 148 can be extended or retracted by the actuator 136. The shaft 148 can be coupled to the second cross support 160 such that the translation of the shaft 148 moves the second cross support 160. The movement of the second cross support 160 can move the arm 142 and arm 144, causing the ends of the plurality of arms to move closer together or farther apart to raise or lower the housing 112. For example, the extension of the shaft 148 can move the lower ends of the arm 142 and arm 144 away from the lower ends of the arm 138 and arm 140, causing the upper ends of the arm 138 and arm 140 to move away from the upper ends of the arm 142 and arm 144 and the housing 112 to vertically lower. The retraction of the shaft 148 can move the lower ends of the arm 142 and arm 144 toward from the lower ends of the arm 138 and arm 140, causing the upper ends of the arm 138 and arm 140 to move towards the upper ends of the arm 142 and arm 144 and the housing 112 to vertically raise.

Figure 4A:
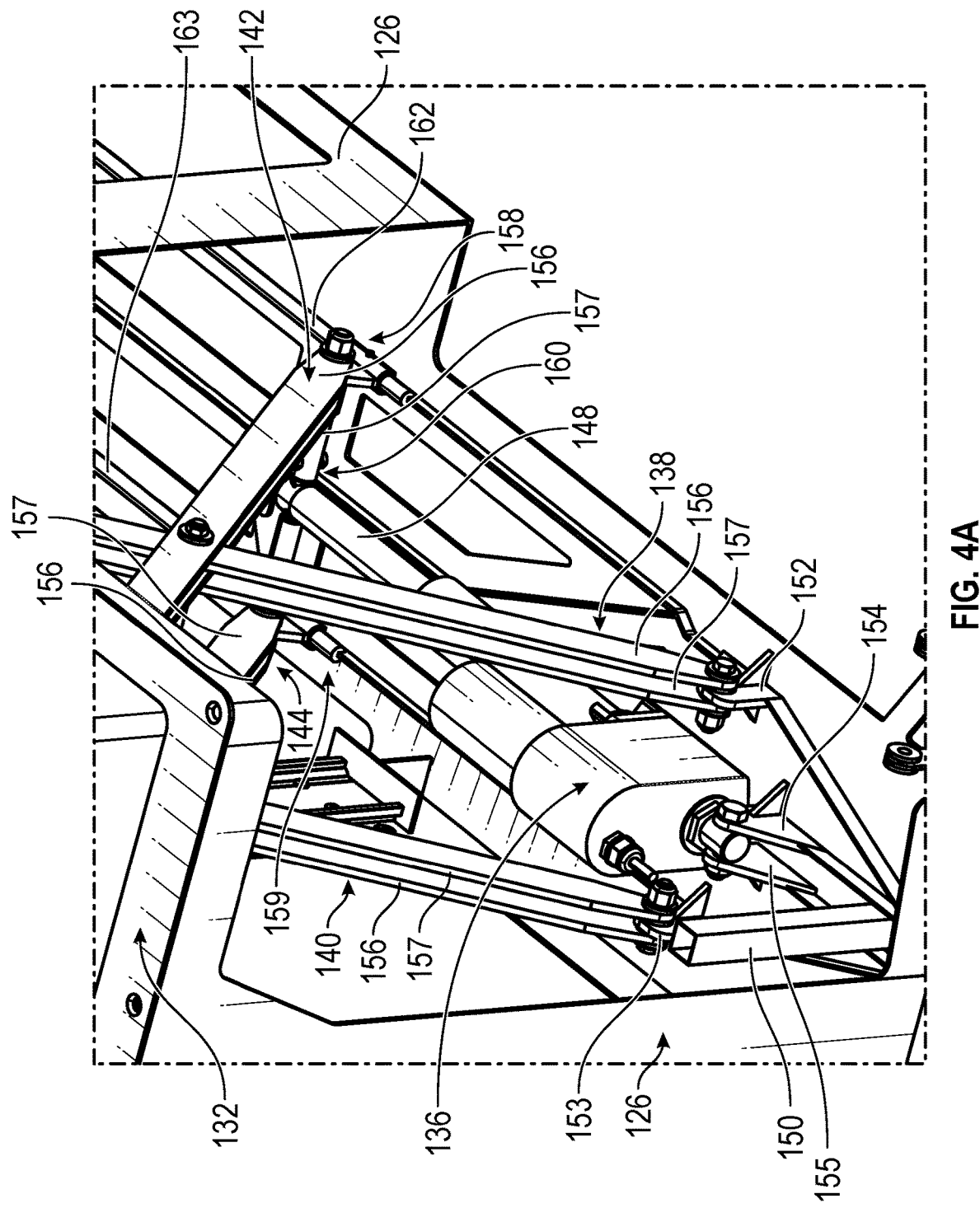
FIG. 4A illustrates a view of a scissor lift assembly of the galley unit.

FIG. 4A shows a view of a lower portion of the galley unit 100. As illustrated, each of the arm 138, arm 140, arm 142, and/or arm 144 can include a first arm 156 (e.g., first arm member, first arm component) and a second arm 157 (e.g., second arm member, second arm component). The first arm 156 and/or second arm 157 can be the same size and/or shape. The first arm 156 and/or second arm 157 can be elongate structures. The first arm 156 and/or second arm 157 can be flat. The first arm 156 and/or second arm 157 can include a taper at the ends thereof. The first arm 156 and/or second arm 157 can be arranged parallel relative to each other. The first arm 156 and/or second arm 157 can be spaced apart from each other. The first arm 156 can be arranged at an outside position relative to the second arm 157. In some configurations, the first arm 156 of the arm 138 can be disposed between the first arm 156 and second arm 157 of the arm 142. In some configurations, the second arm 157 of the arm 142 can be disposed between the first arm 156 and second arm 157 of the arm 138. In some configurations, the first arm 156 of the arm 140 can be disposed between the first arm 156 and the second arm 157 of the arm 144. In some configurations, the second arm 157 of the arm 144 can be disposed between the first arm 156 and the second arm 157 of the arm 140.

The arm 138 can be rotatably coupled to the frame 126 (e.g., bottom of the frame 126) and/or a surface of the boat. The frame 126 can include a flange 152. The flange 152 can extend upward from a bottom of the frame 126. The arm 138 can be rotatably coupled to the flange 152 with a bolt. The first arm 156 and second arm 157 of the arm 138 can be disposed on opposing sides of the flange 152.

The arm 140 can be rotatably coupled to the frame 126 (e.g., bottom of the frame 126) and/or a surface of the boat. The frame 126 can include a flange 153. The flange 153 can extend upward from a bottom of the frame 126. The flange 153 can be the same size and/or shape as the flange 152. The flange 153 and flange 152 can be parallel relative to each other. The arm 140 can be rotatably coupled to the flange 153 with a bolt. The first arm 156 and second arm 157 of the arm 140 can be disposed on opposing sides of the flange 153.

The actuator 136 can be coupled to the frame 126 (e.g., bottom of the frame 126) and/or a surface of the boat. The frame 126 can include a flange 154 and/or a flange 155. The flange 154 and flange 155 can be the same size and/or shape. The flange 154 and/or flange 155 can extend upward from a bottom of the frame 126. The flange 154 and flange 155 can be parallel relative to each other. The actuator 136 can be coupled to the flange 154 and/or flange 155. The actuator 136 can be rotatably coupled to the flange 154 and/or flange 155, which can help to accommodate vibrations. The actuator 136 can have a shaft 137, which can also be referred to as a member, that can be coupled to the flange 154 and/or flange 155. In some configurations, the shaft 137 can be disposed between the flange 154 and flange 155.

The scissor lift assembly 134 can include a first connector 158 and/or a second connector 159. The first connector 158 can be coupled to the arm 142. The first connector 158 can be slidably coupled to a first rail 162 of the frame 126 to enable the lower end of the arm 142 to translate towards and away from the actuator 136 while remaining coupled to the first rail 162. In some configurations, the first rail 162 can be disposed on a surface of the boat. The first rail 162 can include a cylindrical shape.

The second connector 159 can be coupled to the arm 144. The second connector 159 can be slidably coupled to a second rail 163 of the frame 126 to enable the lower end of the arm 144 to translate towards and away from the actuator 136 while remaining coupled to the second rail 163. In some configurations, the second rail 163 can be disposed on a surface of the boat. The first rail 162 and second rail 163 can be parallel to each other. The second rail 163 can include a cylindrical shape.

Figure 4B:
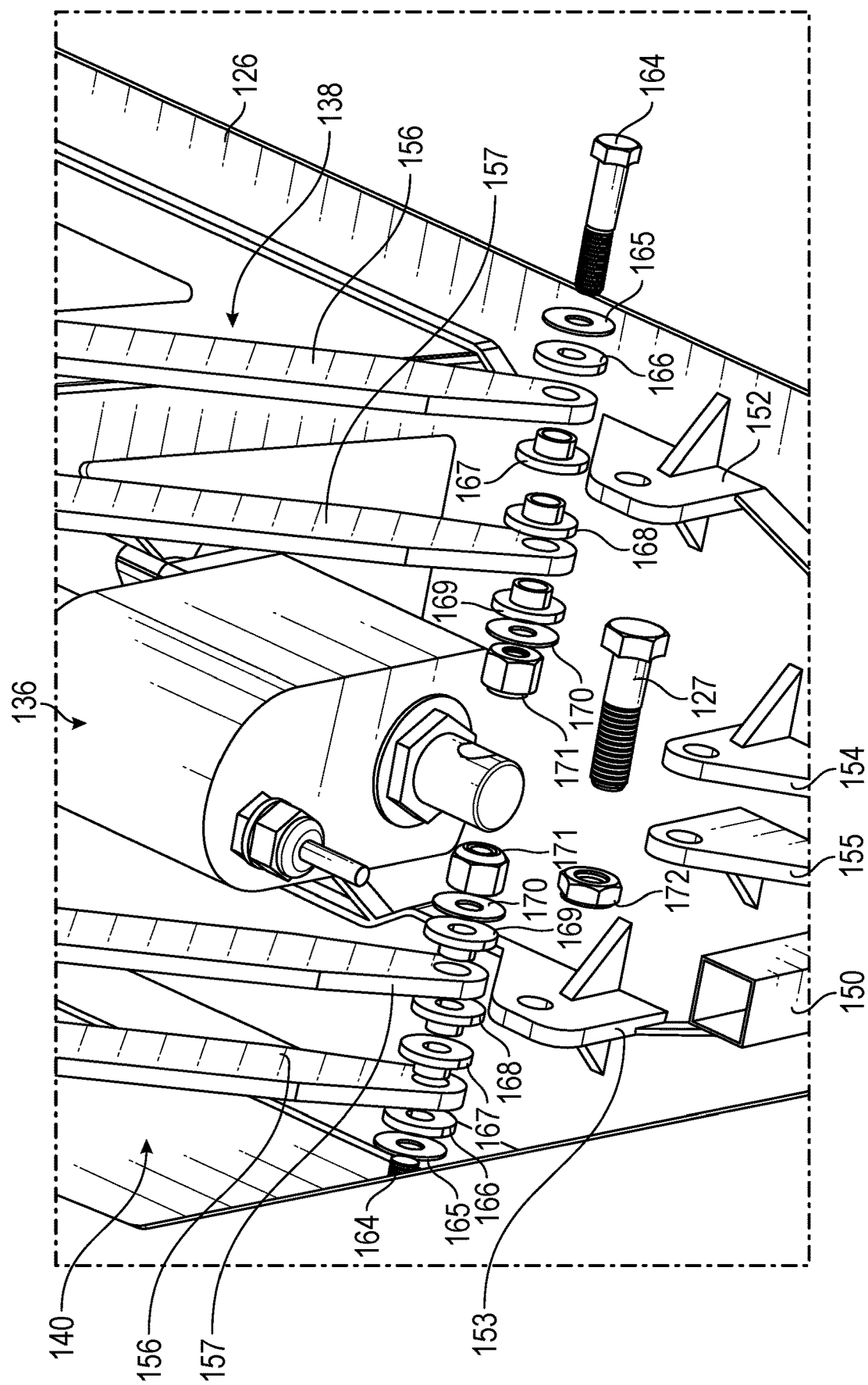
FIG. 4B illustrates a partially exploded view of the scissor lift assembly.

FIG. 4B illustrates a partially exploded view of features of the scissor lift assembly 134. As described herein, the arm 138 can be coupled to the flange 152. The arm 138 can be coupled to the flange 152 with a bolt 164 and nut 171. A washer 165, which can be metal, and a washer 166, which can be a polymer that facilities rotation, can be disposed between the head of the bolt 164 and the first arm 156 of the arm 138. The washer 165 can be disposed between the washer 165 and the first arm 156 of the arm 138. A first shoulder washer 167 (e.g., bush, step washer, etc.) can be disposed on the bolt 164 and through a hole at an end portion of the first arm 156 of the arm 138 and a flange portion of the first shoulder washer 167 can be positioned between the first arm 156 of the arm 138 and the flange 152. A second shoulder washer 168 (e.g., bush, step washer, etc.) can be disposed on the bolt 164 and through a hole in the flange 152 and a flange portion of the second shoulder washer 168 can be positioned between the second arm 157 of the arm 138 and the flange 152. A third shoulder washer 169 (e.g., bush, step washer, etc.) can be disposed on the bolt 164 and through a hole at an end portion of the second arm 157 of the arm 138 and a flange portion of the third shoulder washer 169 can be positioned between the second arm 157 of the arm 138 and a washer 170. The washer 170, which can be made of metal, can be disposed between the third shoulder washer 169 and the nut 171. The first shoulder washer 167, second shoulder washer 168, and/or third shoulder washer 169 can be made of a polymer, which can facilitate rotation of the first arm 156 and second arm 157 of the arm 138.

As described herein, the arm 140 can be coupled to the flange 153. The arm 140 can be coupled to the flange 153 with a bolt 164 and nut 171. A washer 165, which can be metal, and a washer 166, which can be a polymer, can be disposed between the head of the bolt 164 and the first arm 156 of the arm 140 The washer 165 can be disposed between the washer 165 and the first arm 156 of the arm 140. A first shoulder washer 167 can be disposed on the bolt 164 and through a hole at an end portion of the first arm 156 of the arm 140 and a flange portion of the first shoulder washer 167 can be positioned between the first arm 156 of the arm 140 and the flange 153. A second shoulder washer 168 can be disposed on the bolt 164 and through a hole in the flange 153 and a flange portion of the second shoulder washer 168 can be positioned between the second arm 157 of the arm 140 and the flange 153. A third shoulder washer 169 can be disposed on the bolt 164 and through a hole at an end portion of the second arm 157 of the arm 140 and a flange portion of the third shoulder washer 169 can be positioned between the second arm 157 of the arm 140 and a washer 170. The washer 170, which can be made of metal, can be disposed between the third shoulder washer 169 and the nut 171. The first shoulder washer 167, second shoulder washer 168, and/or third shoulder washer 169 can be made of a polymer, which can facilitate rotation of the first arm 156 and second arm 157 of the arm 140.

As described herein, the actuator 136 can be coupled, which can include rotatably coupled, to the flange 154 and/or flange 155. The shaft 137 of the actuator 136 can be disposed between the flange 154 and flange 155. A bolt 127 can extend through the flange 154, shaft 137, and flange 155 and be secured with a nut 172 to couple (e.g., rotatably couple) the actuator 136 to the flange 154 and flange 155.

Figure 5A:
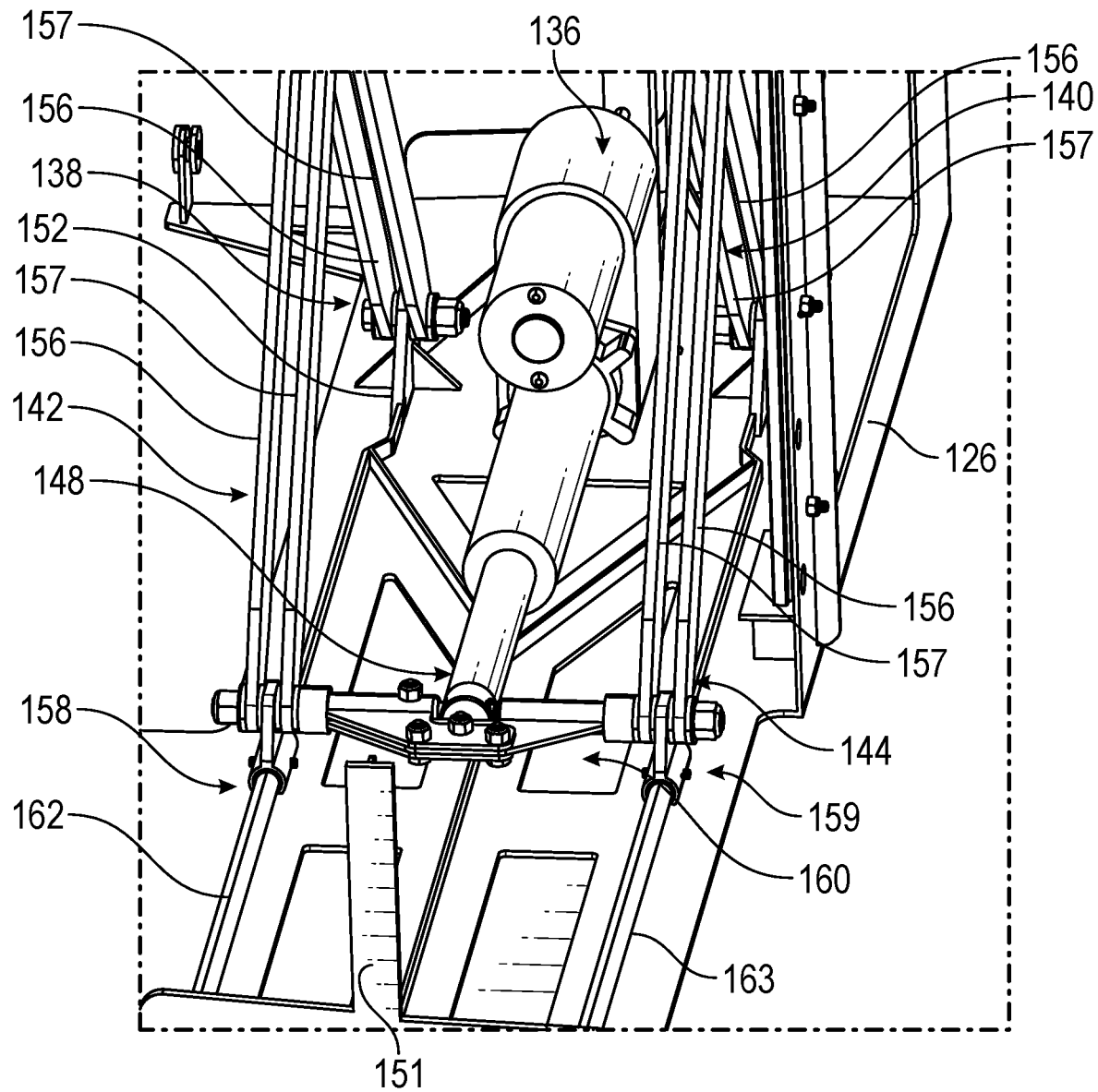
FIG. 5A illustrates another view of the scissor lift assembly.

FIG. 5A shows the second cross support 160, which can also be referred to as a shaft or distributed shaft. As described herein, the second cross support 160 can be rotatably coupled to the arm 142 and arm 144. The arm 142 (e.g., an end portion of the arm 142) can be coupled to the first connector 158 which can be slidably coupled to the first rail 162 of the frame 126. The arm 144 (e.g., an end portion of the arm 144) can be coupled to the second connector 159 which can be slidably coupled to the second rail 163 of the frame 126.

Figure 5B:
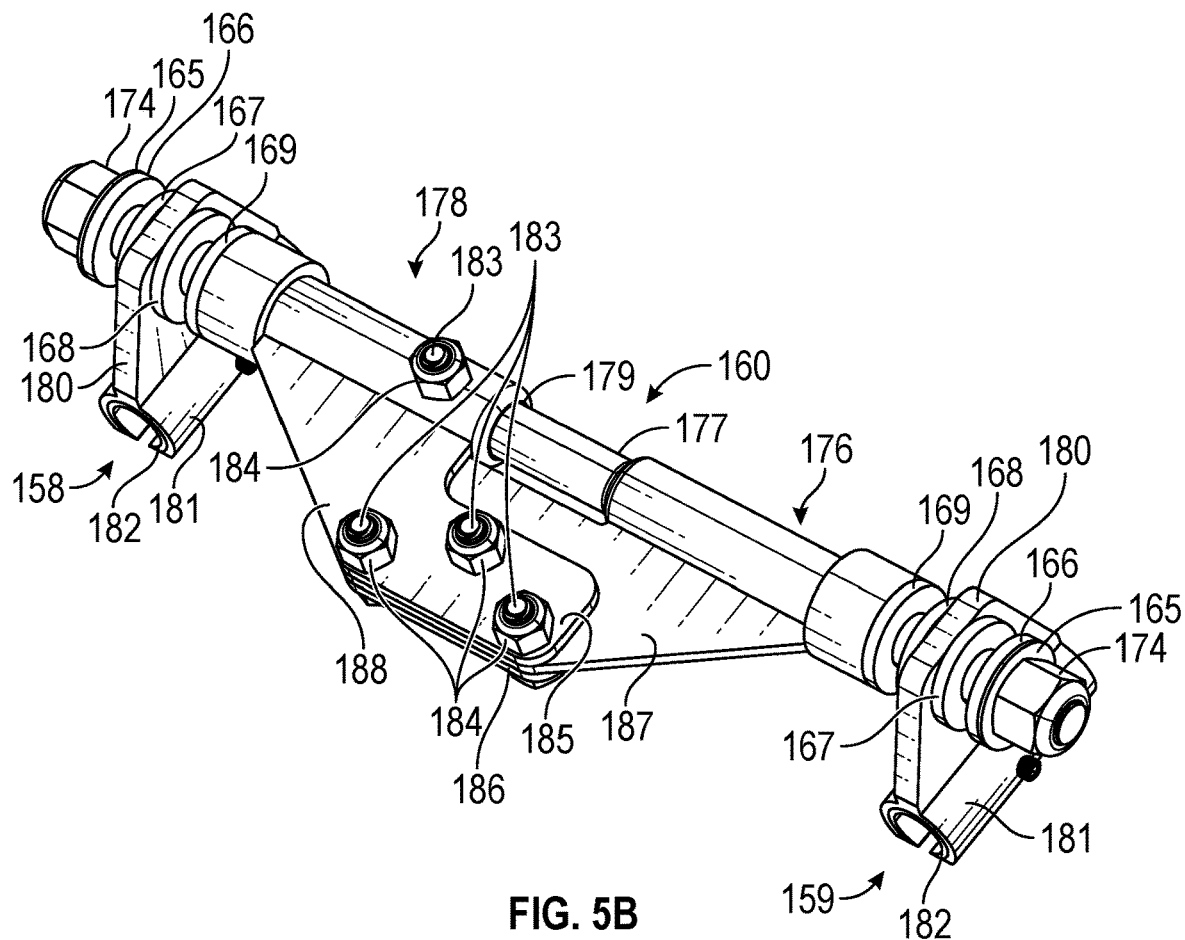
FIG. 5B illustrates a second cross support of the scissor lift assembly.
Figure 5C:
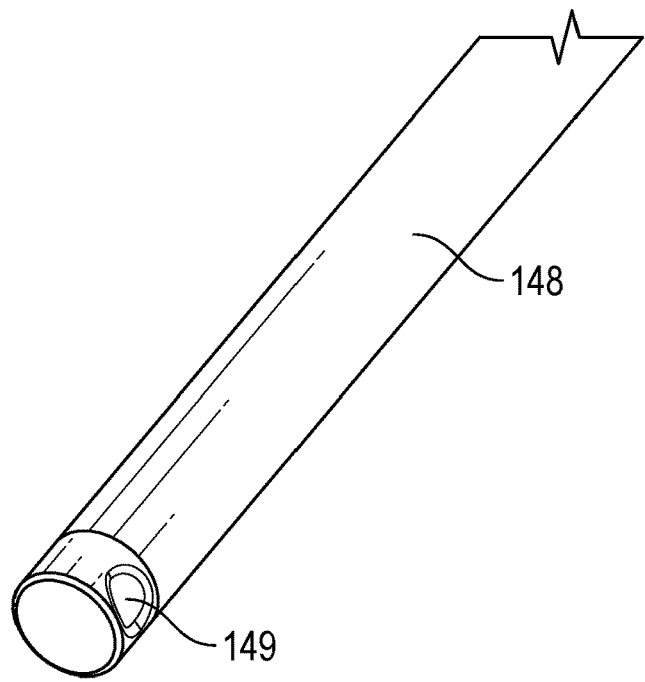
FIG. 5C illustrates a shaft that can be moved by an actuator to actuate the scissor lift assembly between the stowed and deployed configurations.
Figure 5D:
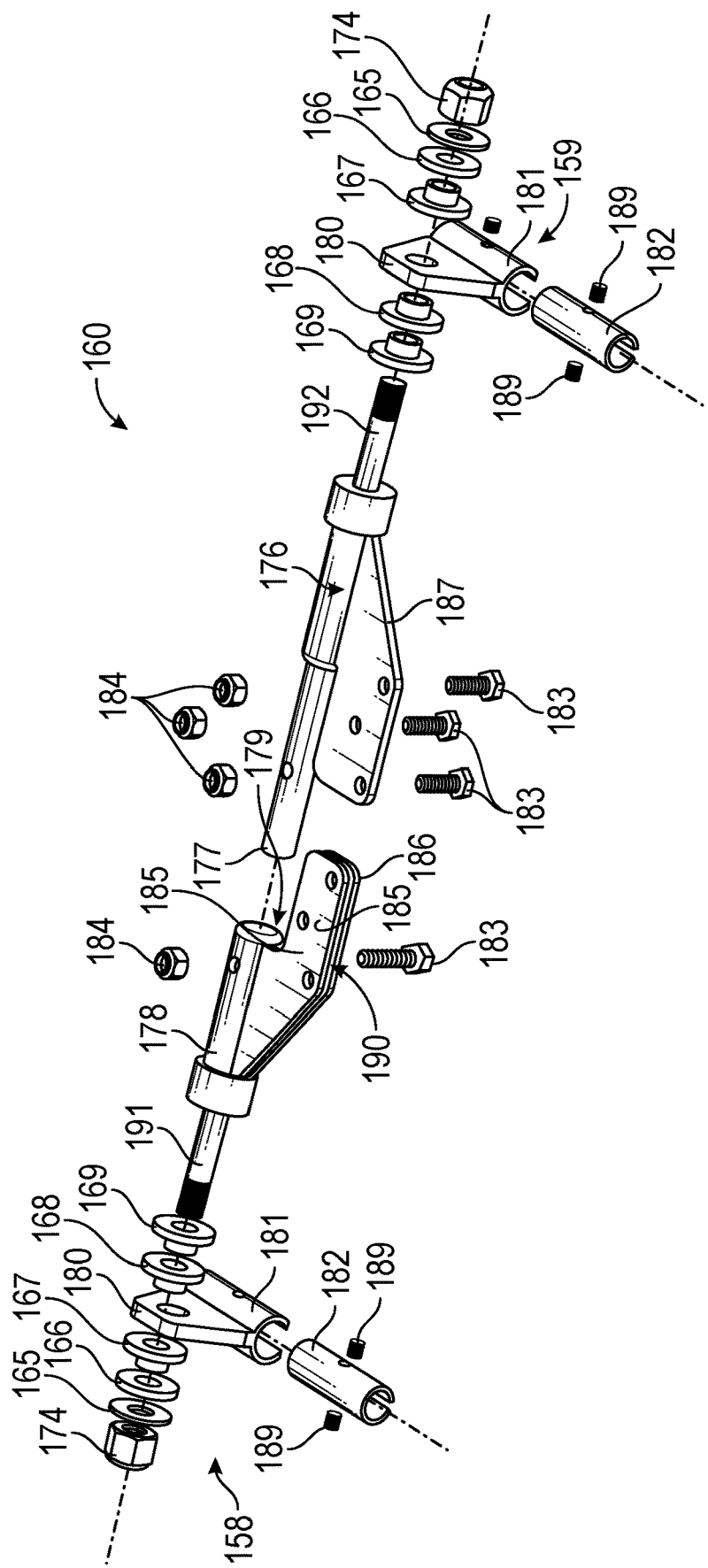
FIG. 5D illustrates an exploded view of the second cross support in FIG. 5B.

FIG. 5B illustrates another view of the second cross support 160 without the arms and FIG. 5C shows an exploded view of the second cross support 160. The second cross support 160 can include a shaft 176 (e.g., first shaft) and a receiver 178, which can also be referred to as a secondary shaft or second shaft. The shaft 176 can include an end portion 177. The end portion 177 can include a reduced diameter compared to an adjoining portion of the shaft 176, as shown in FIG. 5D. The end portion 177 can be positioned through an aperture 149 of the shaft 148, illustrated in FIG. 5C, of the actuator 136. The end portion 177 can then be positioned within an aperture 179 of the receiver 178 to couple the shaft 176 and receiver 178 together and secure the second cross support 160 to the shaft 148 of the actuator 136. A bolt 183 can extend through the end portion 177 and the receiver 178 and be secured with a nut 184.

The shaft 176 can include a flange 187. The receiver 178 can include a flange 185 (e.g., upper flange) and a flange 186 (e.g., lower flange). A gap 190 can separate the flange 185 and the flange 186. The flange 187 of the shaft 176 can be disposed in the gap 190 and between the flange 185 and the flange 186 when the end portion 177 of the shaft 176 is disposed in the aperture 179 of the receiver 178. A plurality of bolts 183 can couple the shaft 176 to the receiver 178. For example, a plurality of bolts 183 (e.g., three) can extend through the flange 186, flange 187, and flange 185 and be secured with a plurality of nuts 184 to couple the shaft 176 and the receiver 178 together.

The receiver 178 can include a first shaft 191. The first shaft 191 can be a portion of the shaft 176 with a reduced diameter compared to a remainder and/or adjoining portion of the receiver 178. The first connector 158 can be coupled to the first shaft 191 of the receiver 178. For example, the first shaft 191 can extend through a hole disposed in a flange 180 of the first connector 158. The arm 142 can be coupled to the first shaft 191 and secured with a nut 174. A washer 165 and washer 166 can be disposed on the first shaft 191 and between the nut 174 and the first arm 156 of the arm 142. A first shoulder washer 167 can be disposed on the first shaft 191 and in a hole disposed at an end portion of the first arm 156 of the arm 142 with a flange of the first shoulder washer 167 between the first arm 156 of the arm 142 and the flange 180 of the first connector 158. A second shoulder washer 168 can be disposed on the first shaft 191 and in a hole disposed in the flange 180 of the first connector 158 with a flange of the second shoulder washer 168 disposed between the second arm 157 of the arm 142 and the flange 180 of the first connector 158. A third shoulder washer 169 can be disposed on the first shaft 191 and in a hole disposed at an end portion of the second arm 157 of the arm 142 with a flange of the second shoulder washer 168 disposed between the second arm 157 of the arm 142 and an adjoining enlarged portion of the receiver 178 compared to the first shaft 191.

The first connector 158 can include a receiver 181. The receiver 181 can include a cylindrical shape, which can have an elongate gap, that corresponds to the first rail 162. The receiver 181 can receive the first rail 162 therein such that first connector 158 is secured thereon but slides. An insert 182 can be disposed in the receiver 181. The insert 182 can include a cylindrical shape, which can have an elongate gap, that corresponds to the first rail 162. The insert 182 can be secured in the receiver 181 with one or more screws 189 or the like. The insert 182 can receive the first rail 162 therein such that the insert 182 is secured on the first rail 162 but slides. The insert 182 can be made of a material that promotes sliding on the first rail 162, which can include a polymer or other suitable materials.

The shaft 176 can include a second shaft 192. The second shaft 192 can be a portion of the shaft 176 with a reduced diameter compared to a remainder and/or adjoining portion of the shaft 176. The second connector 159 can be coupled to the second shaft 192 of the shaft 176. For example, the second shaft 192 can extend through a hole disposed in a flange 180 of the second connector 159. The arm 144 can be coupled to the second shaft 192 and secured with a nut 174. A washer 165 and washer 166 can be disposed on the second shaft 192 and between the nut 174 and the first arm 156 of the arm 144. A first shoulder washer 167 can be disposed on the second shaft 192 and in a hole disposed at an end portion of the first arm 156 of the arm 144 with a flange of the first shoulder washer 167 between the first arm 156 of the arm 144 and the flange 180 of the second connector 159. A second shoulder washer 168 can be disposed on the second shaft 192 and in a hole disposed in the flange 180 of the second connector 159 with a flange of the second shoulder washer 168 disposed between the second arm 157 of the arm 144 and the flange 180 of the second connector 159. A third shoulder washer 169 can be disposed on the second shaft 192 and in a hole disposed at an end portion of the second arm 157 of the arm 144 with a flange of the second shoulder washer 168 disposed between the second arm 157 of the arm 144 and an adjoining enlarged portion and/or adjoining portion of the shaft 176 compared to the second shaft 192.

The second connector 159 can include a receiver 181. The receiver 181 can include a cylindrical shape, which can have an elongate gap, that corresponds to the second rail 163. The receiver 181 can receive the second rail 163 therein such that the second connector 159 is secured thereon but slides. An insert 182 can be disposed in the receiver 181. The insert 182 can include a cylindrical shape, which can have an elongate gap, that corresponds to the second rail 163. The insert 182 can be secured in the receiver 181 with one or more screws 189 or the like. The insert 182 can receive the second rail 163 therein such that the insert 182 is secured on the second rail 163 but slides. The insert 182 can be made of a material that promotes sliding on the second rail 163, which can include a polymer or other suitable materials.

Figure 6A:
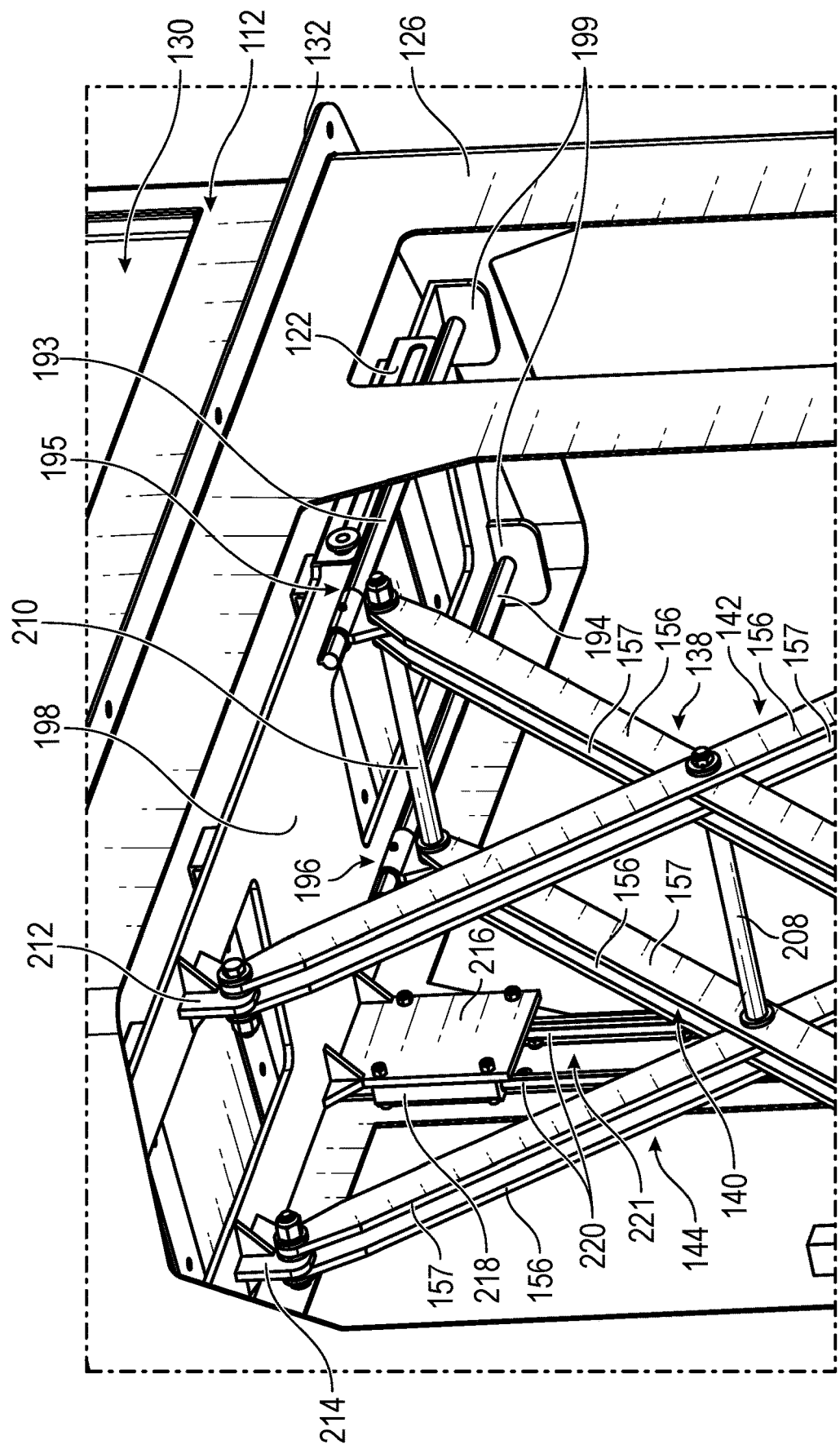
FIG. 6A illustrates a platform of the scissor left assembly that can support a housing of the galley unit.

FIG. 6A illustrates a view of a portion of the galley unit 100. As shown, the housing 112 can be supported by a platform 198. The platform 198 can be coupled to or integral with the housing 112. The platform 198 can be parallel to a surface of the deck 202. A top surface of the housing 112 can be parallel to a surface of the deck 202. The plurality of arms of the scissor lift assembly 134 can be coupled to the platform 198. The arm 142 and arm 144 can be pivotably coupled to the platform 198. For example, the arm 142 can be pivotably coupled to a flange 212 extending downward from the platform 198, and the arm 144 can be pivotably coupled to a flange 214 extending downward from the platform 198. The arm 138 and arm 140 can be slidably coupled to the platform 198. For example, the arm 138 can be coupled to a third connector 195 that can be slidably coupled to a third rail 193 attached to the platform 198, and the arm 140 can be coupled to a fourth connector 196 that can be slidably coupled to a fourth rail 194 attached to the platform 198. The third connector 195 can slide along the third rail 193 during actuation of the scissor lift assembly 134. The fourth connector 196 can slide along the fourth rail 194 during actuation of the scissor lift assembly 134. The platform 198 can include a pair of stops 199. The stops 199 can be disposed at the ends of the third rail 193 and fourth rail 194. The stops 199 can prevent movement of the third connector 195 and fourth connector 196 in a direction along the third rail 193 and fourth rail 194 upon contact.

The platform 198 can include a carriage 218. The carriage 218 can hold one or more bearings. The carriage 218 can be mounted (e.g., mounted with bolts) to a flange 216 of the platform 198. The flange 216 can extend downward from the platform 198. The carriage 218 can be slidably coupled with a vertically-oriented track 221, disposed on the frame 126, having one or more rails 220 to promote straight vertical translation of the platform 198 and housing 112 between the stowed and deployed positions. The bearings housed by the carriage 218 can promote sliding between the carriage 218 and the rails 220 of the track 221.

FIG. 6B shows an exploded view of the first cross support 208 and the plurality of arms. As described herein, the plurality of arms (e.g., arm 138, arm 142, arm 140, and/or arm 144) can be rotatably coupled to the first cross support 208. The first cross support 208 can include a first end 224 and a second end 225. The first end 224 and the second end 225 can have smaller diameters than a middle portion of the first cross support 208.

The arm 138 and arm 142 can be rotatably coupled to the first end 225. A nut 174 can secure the arm 138 and arm 142 on the first end 225. A washer 165 and washer 166 can be disposed on the first end 225 and between the nut 174 and the first arm 156 of the arm 142. A fourth shoulder washer 161, which can be made of a polymer, can be disposed on the first end 225 and in a hole through a middle portion of the first arm 156 of the arm 142 with a flange of the fourth shoulder washer 161 disposed between the first arm 156 of the arm 142 and the first arm 156 of the arm 138. A first shoulder washer 167 can be disposed on the first end 225 and in a hole through a middle portion of the first arm 156 of the arm 138 with a flange of the first shoulder washer 167 disposed between the first arm 156 of the arm 138 and the second arm 157 of the arm 142. A second shoulder washer 168 can be disposed on the first end 225 and in a hole through a middle portion of the second arm 157 of the arm 142 with a flange of the second shoulder washer 168 disposed between the second arm 157 of the arm 142 and a second arm 157 of the arm 138. A third shoulder washer 169 can be disposed on the first end 225 and in a hole through a middle portion of the second arm 157 of the arm 138 with a flange of the third shoulder washer 169 disposed between the second arm 157 of the arm 138 and the middle portion of the first cross support 208, which can be larger in diameter than the first end 225. The shoulder washers can promote rotation of the arm 138 and arm 142.

The arm 140 and arm 144 can be rotatably coupled to the second end 224. A nut 174 can secure the arm 140 and arm 144 on the second end 224. A washer 165 and washer 166 can be disposed on the second end 224 and between the nut 174 and the first arm 156 of the arm 144. A fourth shoulder washer 161 can be disposed on the second end 224 and in a hole through a middle portion of the first arm 156 of the arm 144 with a flange of the fourth shoulder washer 161 disposed between the first arm 156 of the arm 144 and the first arm 156 of the arm 140. A first shoulder washer 167 can be disposed on the second end 224 and in a hole through a middle portion of the first arm 156 of the arm 140 with a flange of the first shoulder washer 167 disposed between the first arm 156 of the arm 140 and the second arm 157 of the arm 144. A second shoulder washer 168 can be disposed on the second end 224 and in a hole through a middle portion of the second arm 157 of the arm 144 with a flange of the second shoulder washer 168 disposed between the second arm 157 of the arm 144 and a second arm 157 of the arm 140. A third shoulder washer 169 can be disposed on the second end 224 and in a hole through a middle portion of the second arm 157 of the arm 140 with a flange of the third shoulder washer 169 disposed between the second arm 157 of the arm 140 and the middle portion of the first cross support 208, which can be larger in diameter than the second end 224. The shoulder washers can promote rotation of the arm 140 and arm 144.

FIG. 6C shows an exploded view of the arm 142 and arm 144 at the flange 212 and flange 214, respectively. The first arm 156 and second arm 157 of the arm 142 can be disposed on opposite sides of the flange 212. A bolt 226 can extend through holes in the first arm 156 of the arm 142, second arm 157 of the arm 142, and flange 212 and be secured with a nut 174. A washer 165 and washer 166 can be disposed on the bolt 226 and between the head of the bolt 226 and the first arm 156 of the arm 142. A first shoulder washer 167 can be disposed on the bolt 226 and in a hole of an end portion of the first arm 156 with a flange of the first shoulder washer 167 disposed between the flange 212 and the first arm 156. A second shoulder washer 168 can be disposed on the bolt 226 and in a hole in the flange 212 with a flange of the second shoulder washer 168 disposed between the second arm 157 of the arm 142 and the flange 212. A third shoulder washer 169 can be disposed on the bolt 226 and in a hole of an end portion of the second arm 157 with a flange of the third shoulder washer 169 disposed between the second arm 157 of the arm 142 and a washer 165. The washer 165 can be disposed on the bolt 226 and between the nut 174 and the third shoulder washer 169.

The first arm 156 and second arm 157 of the arm 144 can be disposed on opposite sides of the flange 214. A bolt 226 can extend through holes in the first arm 156 of the arm 144, second arm 157 of the arm 144, and flange 214 and be secured with a nut 174. A washer 165 and washer 166 can be disposed on the bolt 226 and between the head of the bolt 226 and the first arm 156 of the arm 144. A first shoulder washer 167 can be disposed on the bolt 226 and in a hole of an end portion of the first arm 156 of the arm 144 with a flange of the first shoulder washer 167 disposed between the flange 214 and the first arm 156 of the arm 144. A second shoulder washer 168 can be disposed on the bolt 226 and in a hole in the flange 214 with a flange of the second shoulder washer 168 disposed between the second arm 157 of the arm 144 and the flange 214. A third shoulder washer 169 can be disposed on the bolt 226 and in a hole of an end portion of the second arm 157 of the arm 144 with a flange of the third shoulder washer 169 disposed between the second arm 157 of the arm 144 and a washer 165. The washer 165 can be disposed on the bolt 226 and between the nut 174 and the third shoulder washer 169.

Figure 6D:
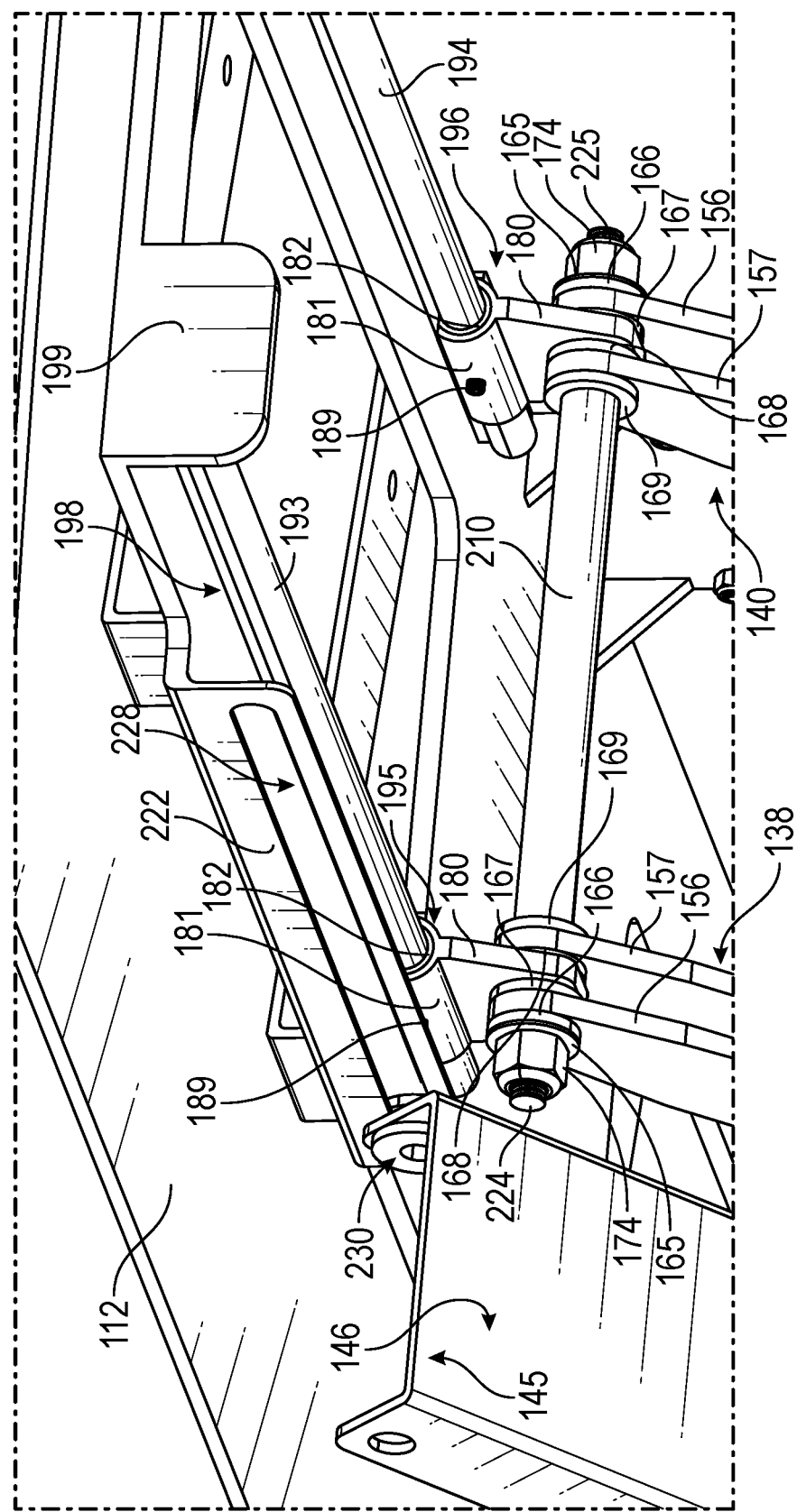
FIG. 6D illustrates a view of two arms of the scissor lift assembly slidably coupled to rails attached to the platform.

FIG. 6D illustrates a view of the platform 198. As described herein, the arm 138 can be coupled to a third connector 195 that can be slidably coupled with a third rail 193 of the platform 198. The arm 140 can be coupled to a fourth connector 196 that can be slidably coupled with a fourth rail 194. The third rail 193 and fourth rail 194 can be cylindrical in shape. The third rail 193 and fourth rail 194 can be parallel to each other. In some variants, the third connector 195 and fourth connector 196 can slide along the third rail 193 and fourth rail 194, respectively, toward the stops 199 when lowering the platform 198 and housing 112 and away from the stops 199 when raising the platform 198 and housing 122. A third cross support 210, which can also be referred to as a bar, shaft, and/or rod, can couple top ends of the arm 138, arm 140, third connector 195, and fourth connector 196 together such that the top ends of the arm 138, arm 140, third connector 195, and fourth connector 196 translate together during actuation of the scissor lift assembly 134.

As described herein, the platform 198 can include a slotted flange 222, which can extend downward from the platform 198. The second end 145 (e.g., top end) of the track 146 can be coupled to the slotted flange 222. For example, a fastener 230, which can incorporate a shoulder washer or bushing, can couple the second end 145 to the slotted flange 222 through a slot 228 of the slotted flange 222. As the platform 198 raises and lowers, the fastener 230 can slide within the slot 228 as the track 146 pivots to facilitate deployment and stowage of the housing 112.

Figure 6E:
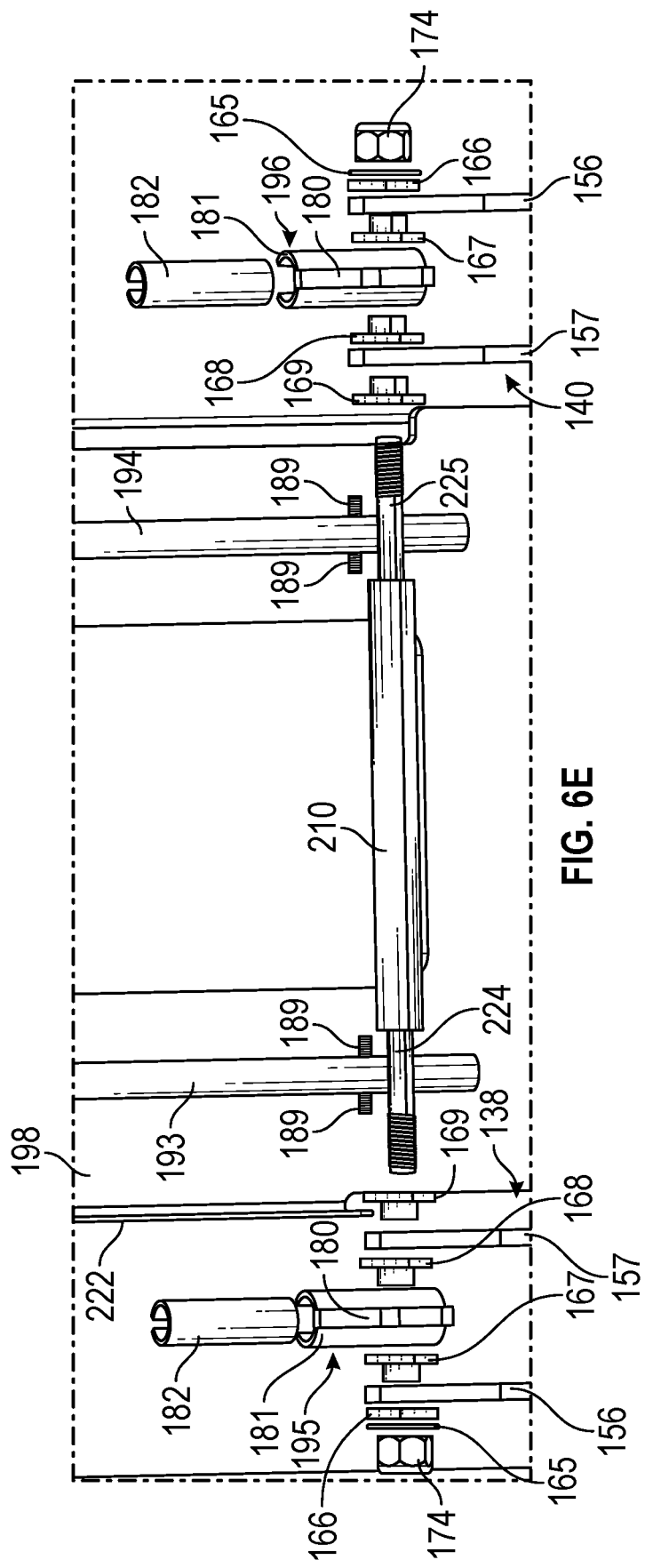
FIG. 6E illustrates an exploded view of the components that can slidably couple the two arms, illustrated in FIG. 6D, to the platform.

FIG. 6E illustrates an exploded view of the arm 138, arm 140, third connector 195, fourth connector 196, and third cross support 210. The third cross support 210 can be the same as the first cross support 208 in some configurations. The third cross support 210 can have a second end 225 and a first end 224, which can have smaller diameters than a middle portion of the third cross support 210. The arm 138 and the arm 140 can be rotatably coupled to the third cross support 210.

The arm 138 and third connector 195 can be disposed on the first end 224 of the third cross support 210 and secured by a nut 174. A flange 180 of the third connector 195 can be disposed between the first arm 156 and second arm 157 of the arm 138. A washer 165 and washer 166 can be disposed on the first end 224 and between the first arm 156 of the arm 138 and the nut 174. The washer 165 can be disposed between the washer 166 and the nut 174. A first shoulder washer 167 can be disposed on the first end 224 and in a hole in an end portion of the first arm 156 of the arm 138 and a flange of the first shoulder washer 167 can be disposed between the first arm 156 of the arm 138 and the flange 180 of the third connector 195. A second shoulder washer 168 can be disposed on the first end 224 and in a hole of the flange 180 of the third connector 195 and a flange of the second shoulder washer 168 can be disposed between the second arm 157 of the arm 138 and the flange 180 of the third connector 195. A third shoulder washer 169 can be disposed on the first end 224 and in a hole in an end portion of the second arm 157 of the arm 138 and a flange of the third shoulder washer 169 can be disposed between the second arm 157 of the arm 138 and the middle portion of the third cross support 210 with a larger diameter compared to the first end 224.

The third connector 195 can include a receiver 181. The receiver 181 can include a cylindrical shape, which can have an elongate gap, that corresponds to the third rail 193. An insert 182 can be disposed in the receiver 181. The insert 182 can include a cylindrical shape, which can have an elongate gap, that corresponds to the third rail 193. The insert 182 can be secured in the receiver 181 with one or more screws 189 or the like. The insert 182 can receive the third rail 193 therein such that the insert 182 is secured on the third rail 193 but slides. The insert 182 can be made of a material that promotes sliding on the third rail 193, which can include a polymer or other suitable materials.

The arm 140 and fourth connector 196 can be disposed on the second end 225 of the third cross support 210 and secured by a nut 174. A flange 180 of the fourth connector 196 can be disposed between the first arm 156 and second arm 157 of the arm 140. A washer 165 and washer 166 can be disposed on the second end 225 and between the first arm 156 of the arm 140 and the nut 174. The washer 165 can be disposed between the washer 166 and the nut 174. A first shoulder washer 167 can be disposed on the second end 225 and in a hole in an end portion of the first arm 156 of the arm 140 and a flange of the first shoulder washer 167 can be disposed between the first arm 156 of the arm 140 and the flange 180 of the fourth connector 196. A second shoulder washer 168 can be disposed on the second end 225 and in a hole of the flange 180 of the fourth connector 196 and a flange of the second shoulder washer 168 can be disposed between the second arm 157 of the arm 140 and the flange 180 of the third connector 196. A third shoulder washer 169 can be disposed on the second end 225 and in a hole in an end portion of the second arm 157 of the arm 140 and a flange of the third shoulder washer 169 can be disposed between the second arm 157 of the arm 140 and the middle portion of the third cross support 210 with a larger diameter compared to the second end 225.

The fourth connector 196 can include a receiver 181. The receiver 181 can include a cylindrical shape, which can have an elongate gap, that corresponds to the fourth rail 194. An insert 182 can be disposed in the receiver 181. The insert 182 can include a cylindrical shape, which can have an elongate gap, that corresponds to the fourth rail 194. The insert 182 can be secured in the receiver 181 with one or more screws 189 or the like. The insert 182 can receive the fourth rail 194 therein such that the insert 182 is secured on the fourth rail 194 but slides. The insert 182 can be made of a material that promotes sliding on the fourth rail 194, which can include a polymer or other suitable materials.

Figure 6F:
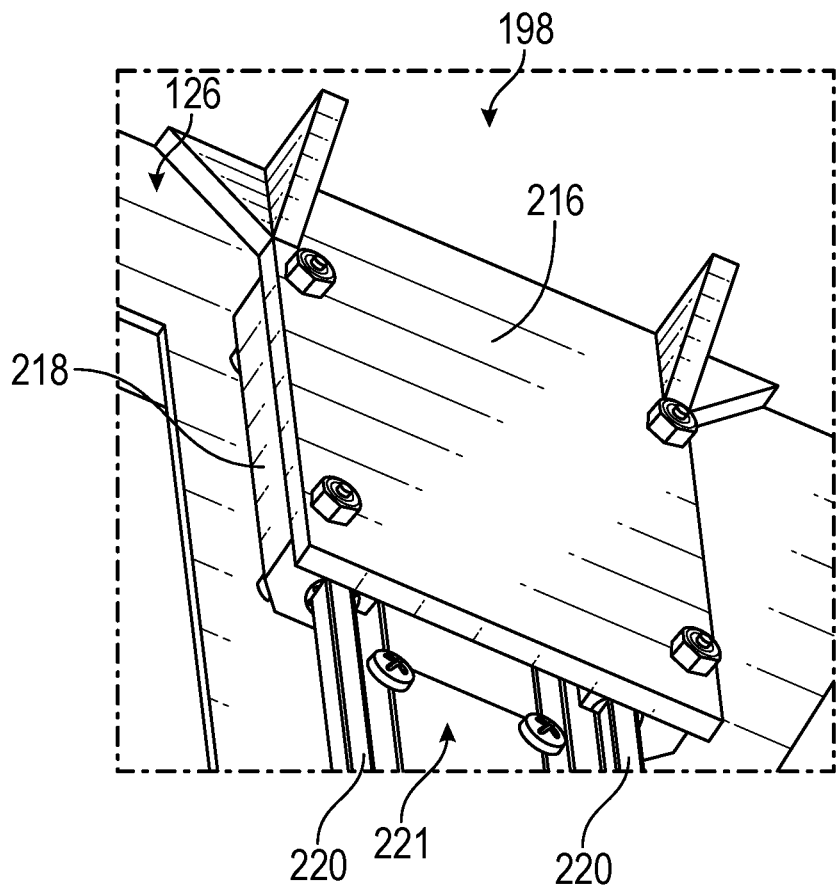
FIG. 6F illustrates a carriage, attached to the platform, that can be slidably coupled to rails of a frame of the galley unit.
Figure 6G:
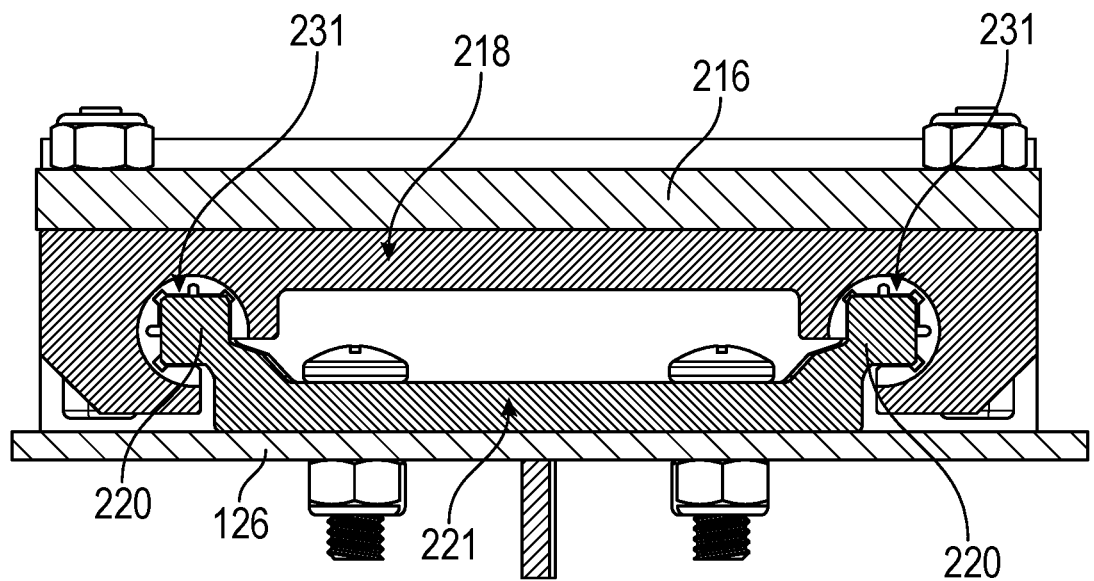
FIG. 6G illustrates a section view of the carriage slidably coupled to the rails illustrated in FIG. 6F.
Figure 7A:
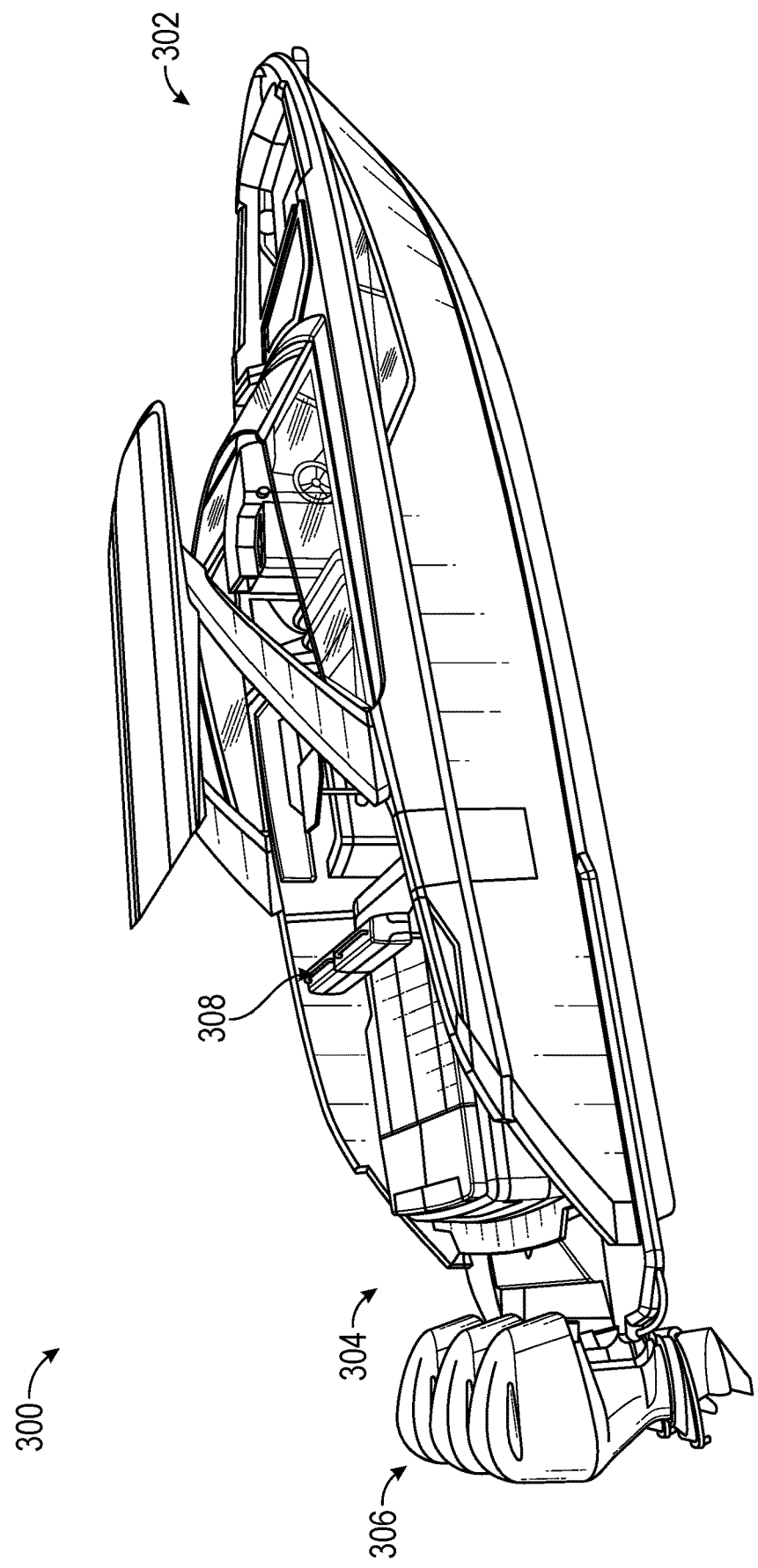
FIGS. 7A-7F illustrate various views of a boat.
Figure 7B:
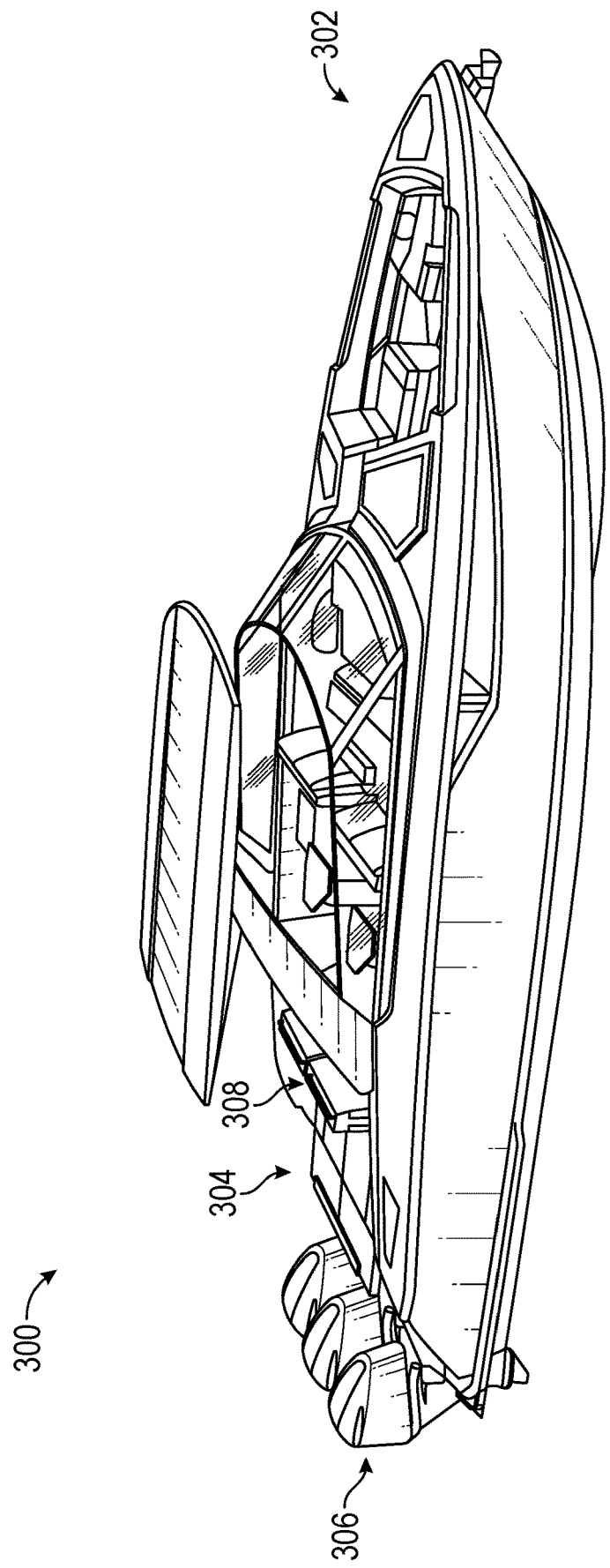
Figure 7C:
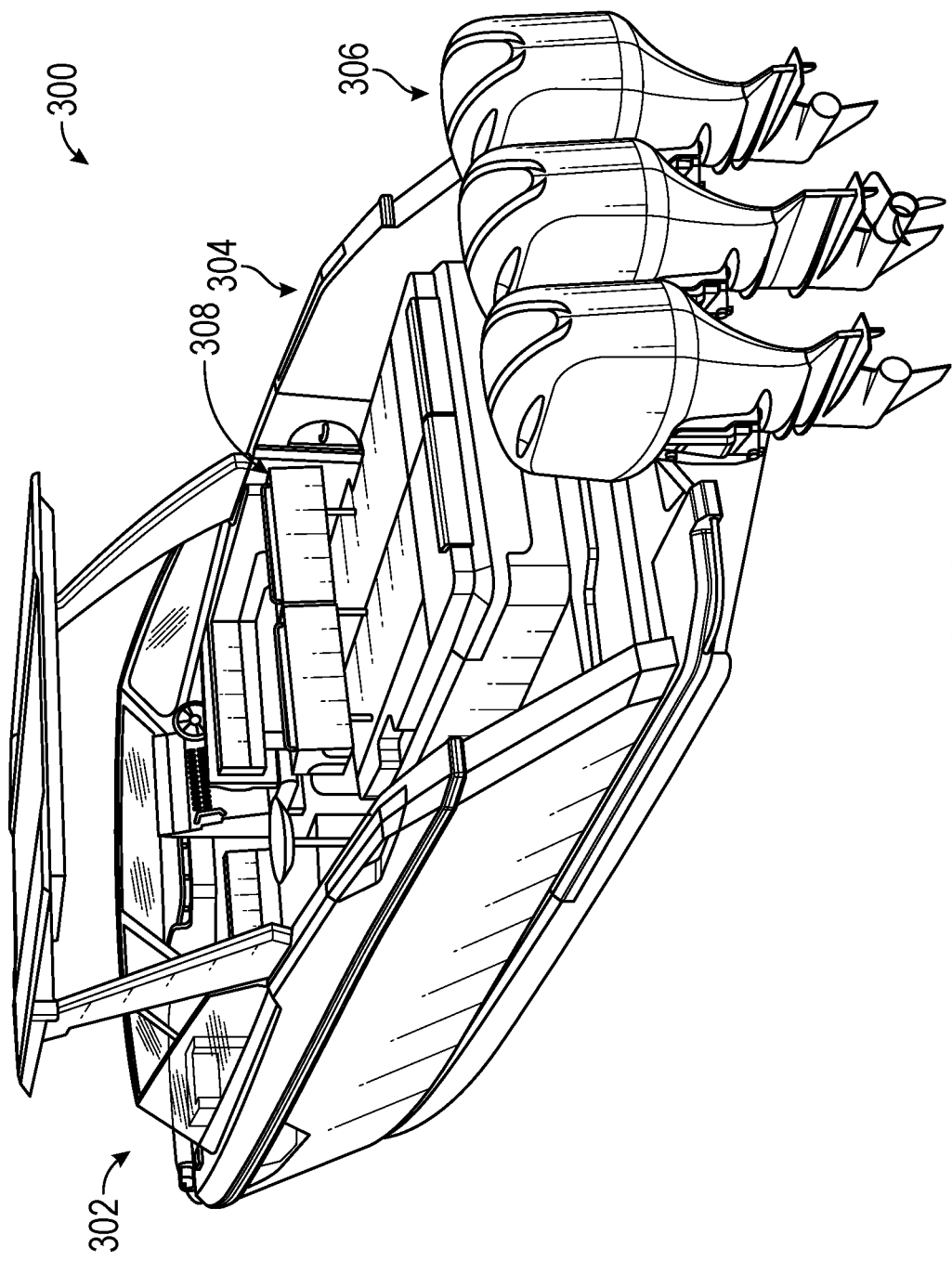
Figure 7D:
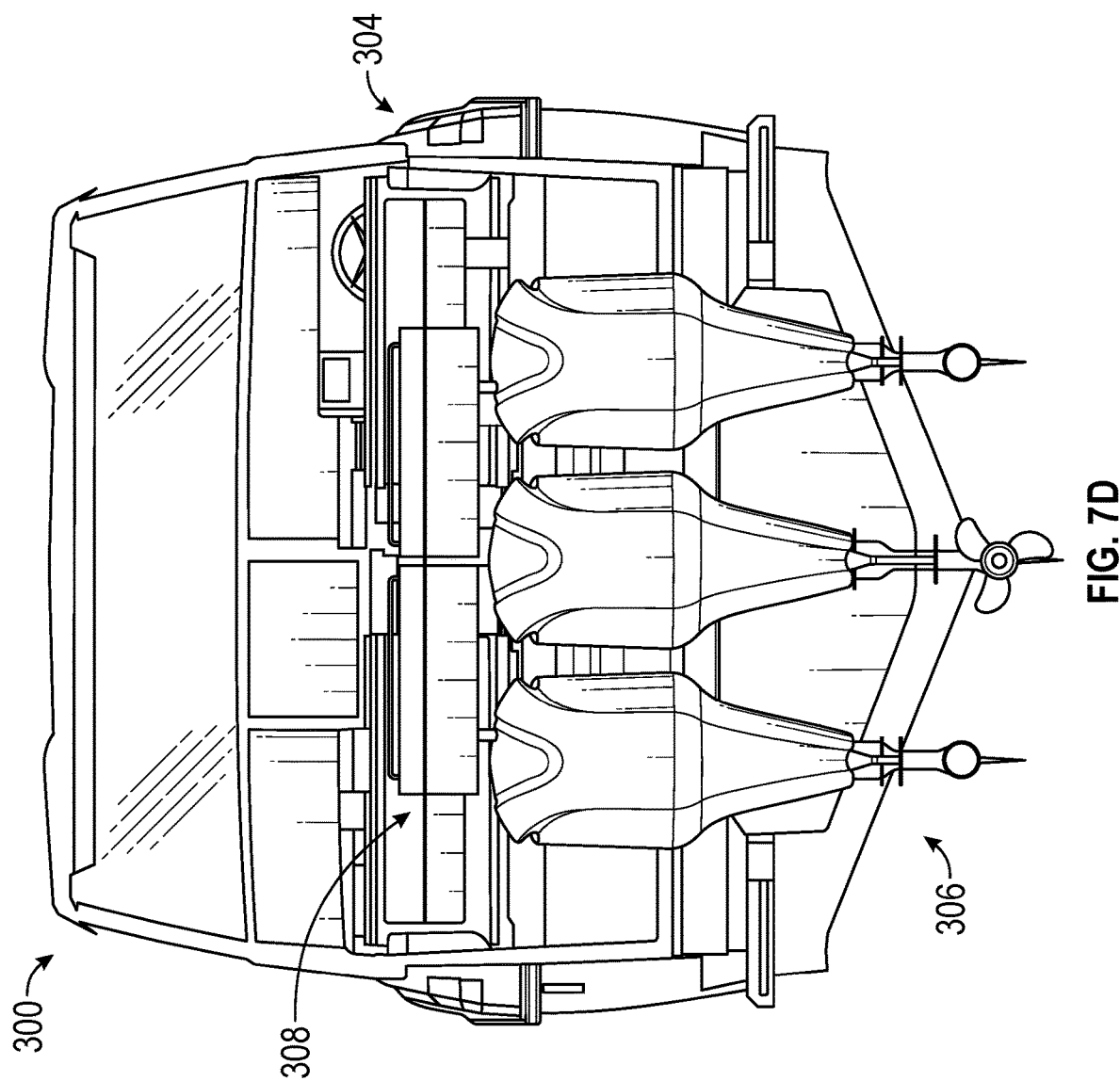
Figure 7E:
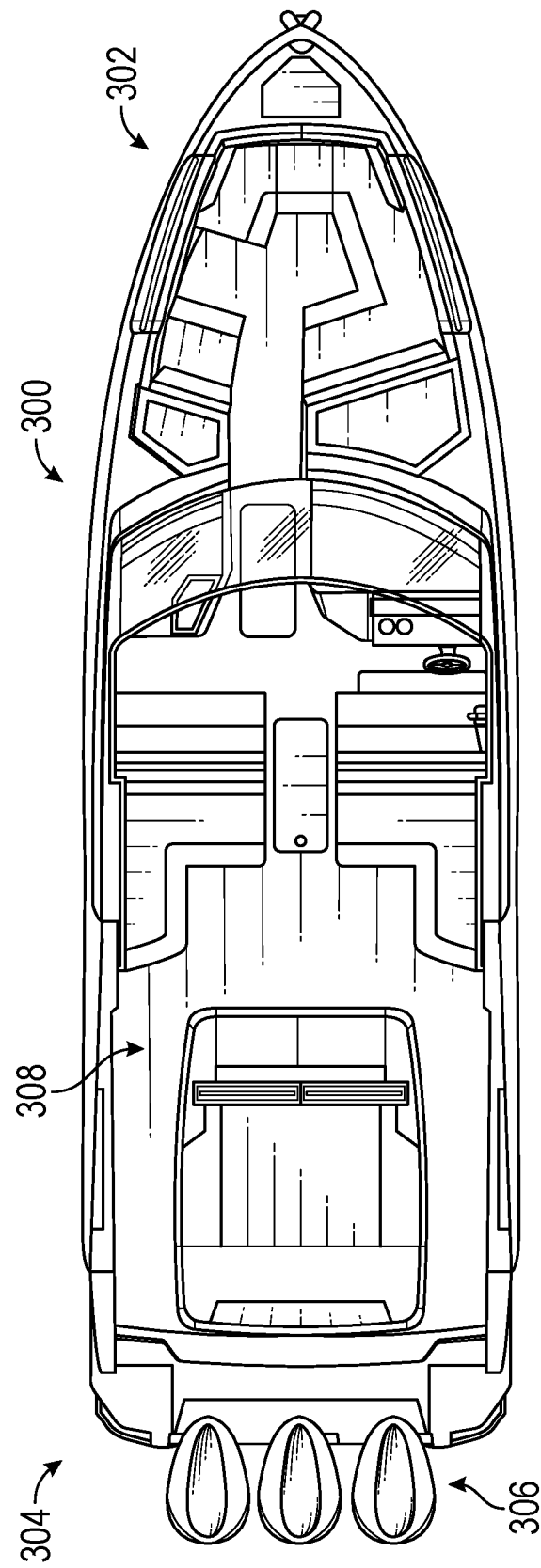
Figure 7F:
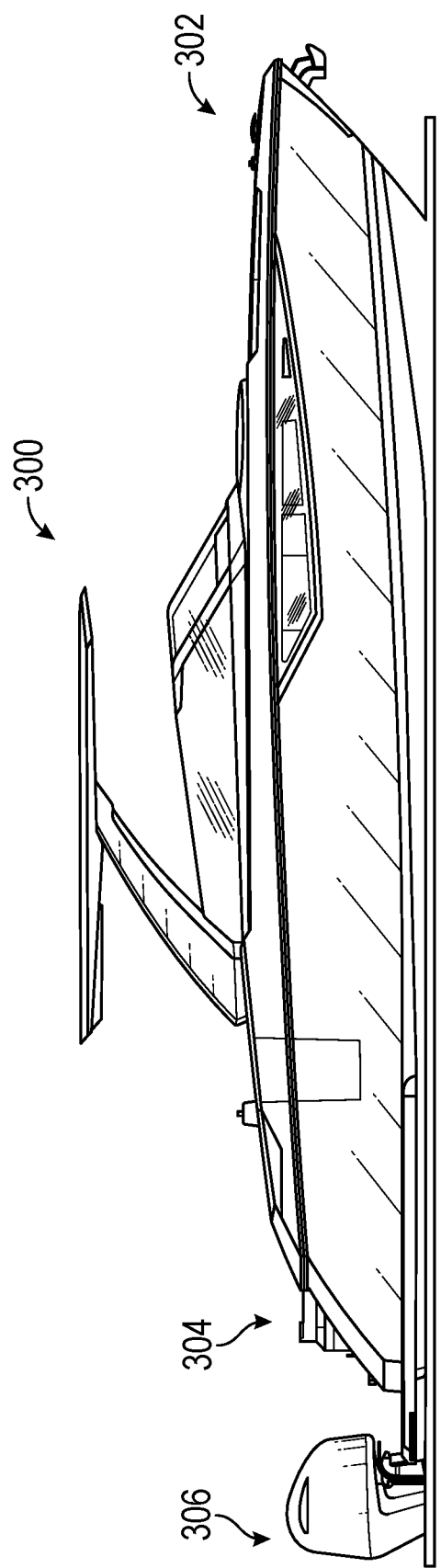

FIG. 6F illustrates a view of the carriage 218 slidably coupled to the rails 220 of a track 221. The carriage 218 can be coupled to or integrally formed with a flange 216 extending downward from the platform 198. The carriage 218 can be coupled to the flange 216 with one or more bolts. The track 221 and rails 220 thereof, which can be disposed on the frame 126, can extend a length that corresponds to a vertical movement range of the housing 112. As shown in the section view in FIG. 6G, the carriage 218 can include bearing receivers 231 that couple with the rails 220. The bearing receiver 231 can house one or more bearings therein to facilitate sliding of the carriage 218 relative to the rails 220 as the platform 198 is raised and lowered. The rails 220 can have a polygonal periphery (e.g., square, rectangular). The rails 220 can have rounded edges. The bearing receivers 231 can encircle at least a portion of the rails 220.

FIGS. 7A-7F illustrate various views of a boat 300 (e.g., powerboat). The boat 300 has a bow 302 and stern 304. The boat 300 can have one or more motors 306 disposed at the stern 304. In some configurations, the motors 306 can be inboard. The boat 300 can have one or more seats 308. The seat(s) 308 can be positioned proximate the bow 302, proximate the stern 304, and/or any position therebetween.

Figure 8A:
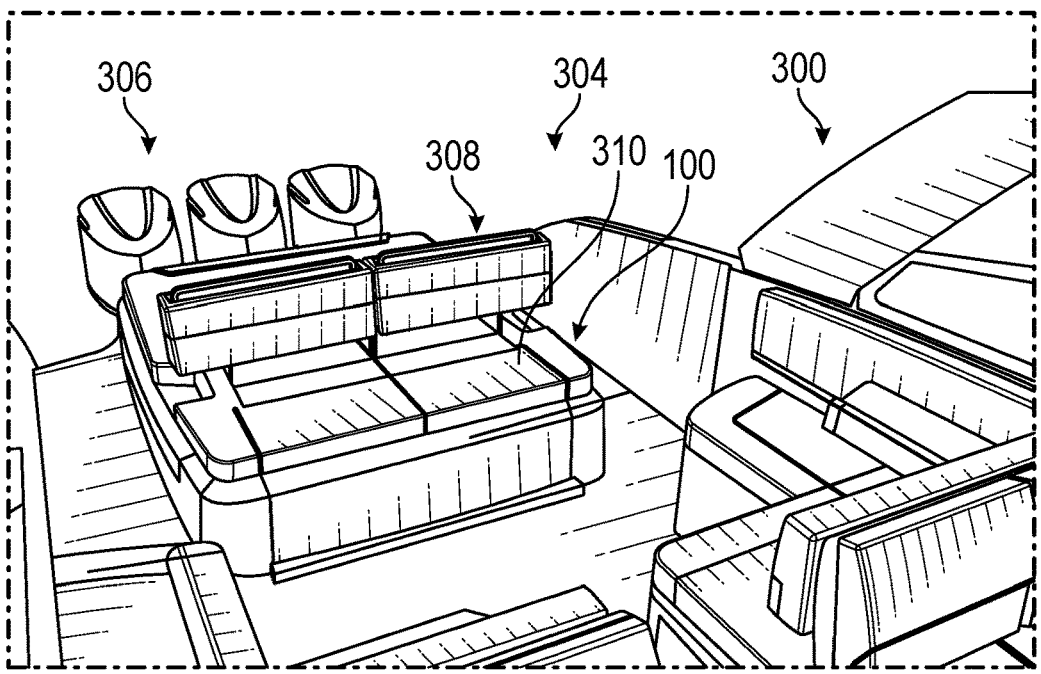
FIG. 8A illustrates the galley unit in a stowed configuration.

FIG. 8A illustrates the galley unit 100 in the stowed configuration. In the stowed configuration, the galley unit 100 can be disposed in the seat 308 (e.g., in a base of the seat 308). The galley unit 100 can be stowed under a seat cover 310 (e.g., seat cushion).

Figure 8B:
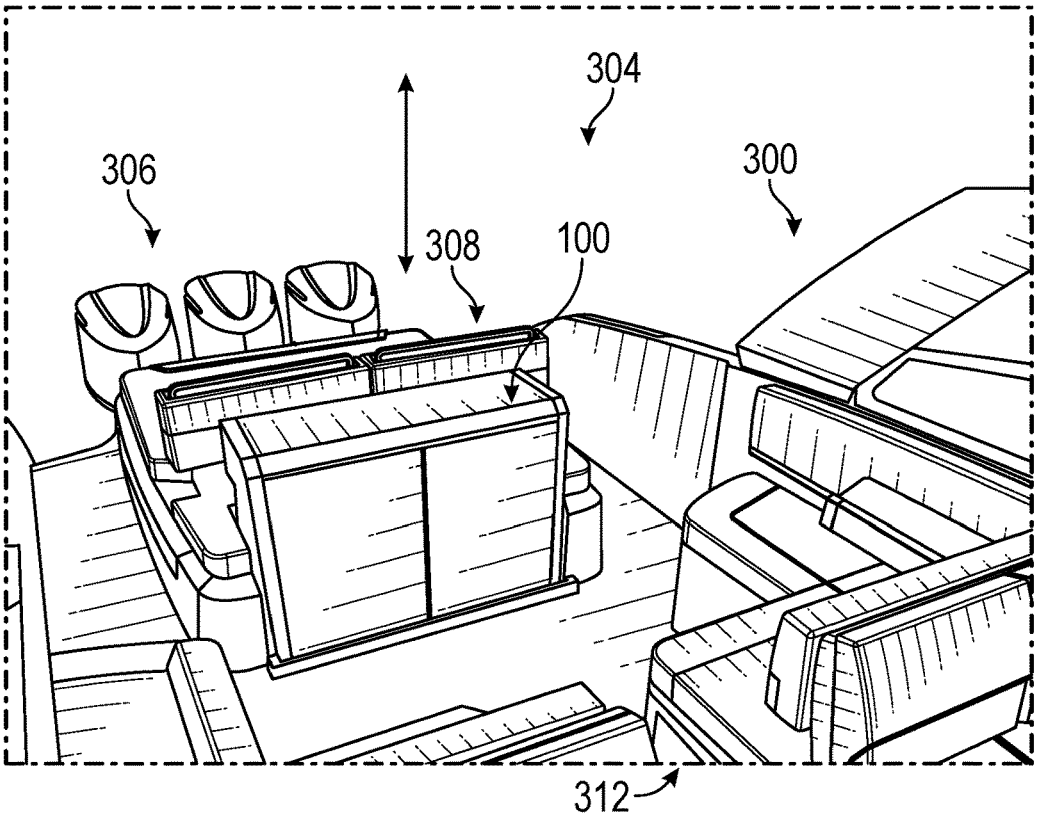
FIG. 8B illustrates the galley unit in a deployed configuration.

FIG. 8B illustrates the galley unit 100 in the deployed configuration. In some variants, the seat cover 310 can be removed from covering a top portion of the galley unit 100 before the galley unit 100 is deployed. In some variants, the seat cover 310 is not removed from covering the top portion of the galley unit 100 before the galley unit 100 is deployed. The galley unit 100 can be deployed, as described herein, vertically straight up, as illustrated in FIG. 4B. The galley unit 100 can be vertically deployed straight up and out from within a cavity of the seat 308. In some variants, the seat cover 310 can be removed from a top portion of the galley unit 100 to expose features thereof (e.g., sink, cutting surface, etc.), which can include the seat cover 310 being connected by a hinge to rotate away from the galley unit 100. In some variants, an actuator can automatically rotate the seat cover 310 off a top surface of the galley unit 100.

Figure 9:
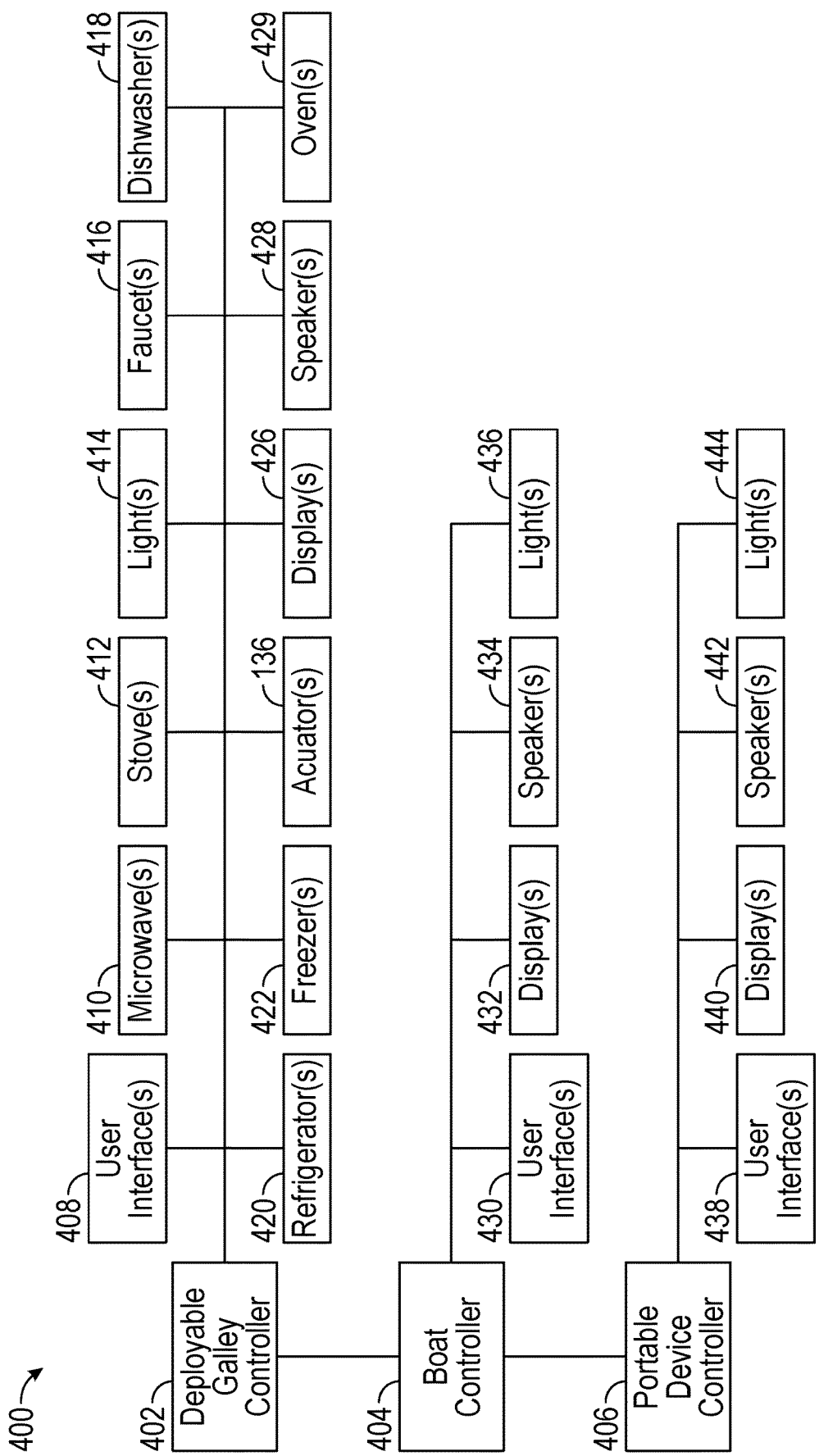
FIG. 9 illustrates a control system.

FIG. 9 illustrates an example arrangement for a control system 400. The control system 400 can include a galley controller 402, boat controller 404, and/or portable device controller 406 (e.g., controller of a user's smart phone, tablet, or laptop). The galley controller 402, boat controller 404, portable device controller 406, and/or other features illustrated in FIG. 9 can be in communication via a wired and/or wireless connection (e.g., Bluetooth, cellular data, etc.) to send and receive commands, data, signals, etc. The galley controller 402, boat controller 404, and/or portable device controller 406 can include and/or be associated with the hardware and/or software to execute the methods described herein.

The galley controller 402 can be in communication via a wired and/or wireless connection (e.g., Bluetooth, cellular data, etc.) with the user interface(s) 408, microwave(s) 410, stove(s) 412, light(s) 414, faucet(s) 416, dishwasher(s) 418, refrigerator(s) 420, freezer(s) 422, actuator(s) 136, display(s) 426, speaker(s) 428, and/or oven(s) 429 to send and receive commands, data, signals, etc. In some configurations, the galley unit 100 can include one or more sensors (e.g. proximity sensors) to determine if the deployment path of the housing 112 is obstructed.

In some configurations, the galley unit 100 can include user interface(s) 408 that can include touchscreen(s), button(s), switch(es), dial(s), lever(s), etc. for controlling different features of the galley unit 100. For example, the user may be able to control the microwave(s) 410, stove(s) 412, light(s) 414, faucet(s) 416, dishwasher(s) 418, refrigerator(s) 420, freezer(s) 422, actuator(s) 136, display(s) 426, speaker(s) 428, and/or oven(s) 429 with the user interface(s) 408. In some configurations, each or at least some of the foregoing features can include separate controllers, which can be in communication with the other features illustrated in FIG. 9. In some configurations, the galley unit 100 can include a user interface(s) 408, such as a momentary switch, to control the actuator(s) 136 to raise or lower the housing 112 of the galley unit 100. The user interface(s) 408 for the actuator(s) 136 can be disposed on the housing 112 (e.g., top 128, front face 130, and/or side face(s) 131), base 102, wall 204, dash, and/or other location on the boat. In some variants, the control system 400 can include a kill switch for the deployable galley unit 100.

In some configurations, the galley controller 402 can send data to the boat controller 404 and/or portably device controller 406 indicative of the status of one or more of the features of the galley unit 100, which can be communicated to the user via the interface(s) 430, display(s) 432, speaker(s) 434, and/or light(s) 436 of the boat and/or the user interface(s) 438, display(s) 440, speaker(s) 442, and/or light(s) 444 of the portable device of the user. For example, the deployed/stowed status of the actuator(s) 136 can be communicated to the user. A warning regarding the deployment or stowage of the housing 112 by the actuator(s) 136 can be communicated to the user. An error regarding the deployment or stowage of the housing 112 by the actuator(s) 136 can be communicated to the user.

Figure 10A:
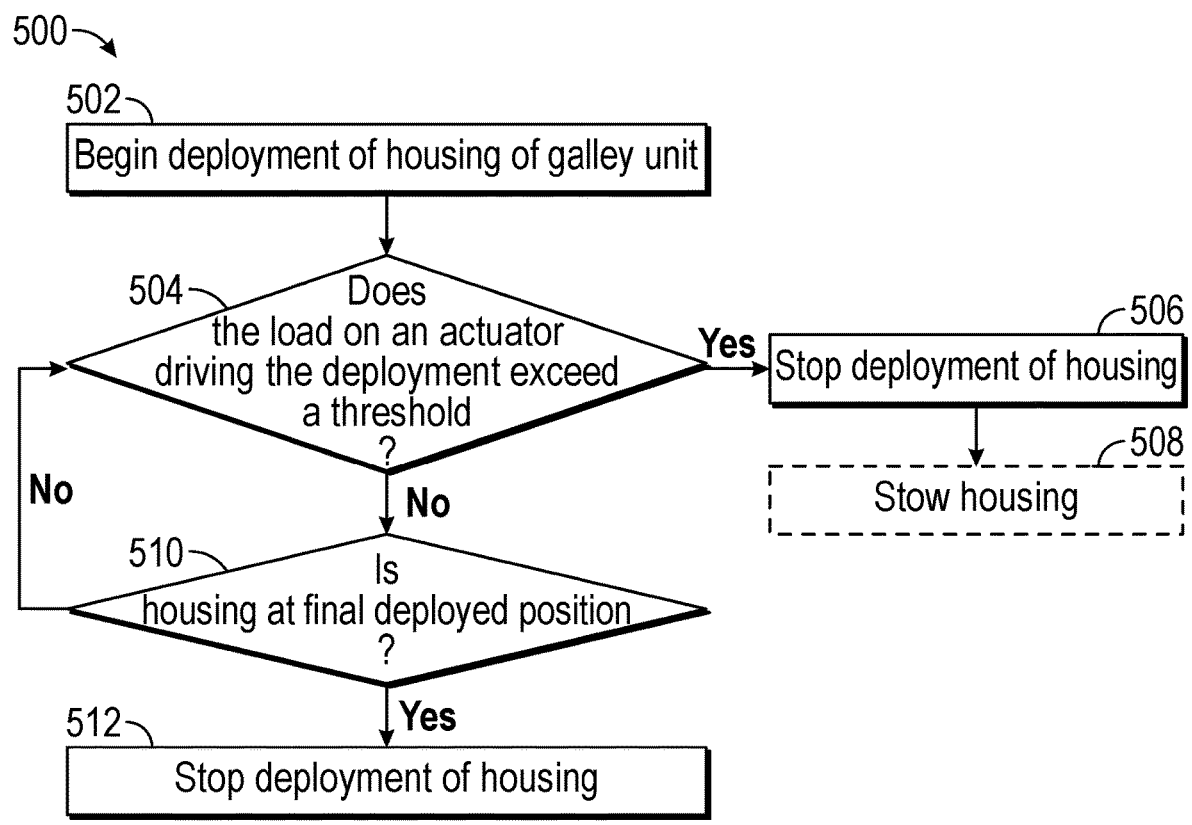
FIG. 10A illustrates a method of deploying the galley unit.

FIG. 10A illustrates a method 500 of deploying the housing 112 of the galley unit 100. At block 502, the actuator 136 can be activated to actuate the scissor lift assembly 134 to raise the housing 112. For example, the shaft 148 of the actuator 136 can be retracted, pulling the second cross support 160 toward the actuator 136 such that the ends of the plurality of arms move closer together to raise the housing 112. The actuator 136 can receive the command to deploy from the user interface(s) 408 (e.g., momentary switch) that can be disposed at the locations described herein, the user interface(s) 430 of the boat (e.g., dashboard controls), and/or user interface(s) 438 of the user's portable device. [0120] At block 504, the galley controller 402, boat controller 404, and/or actuator 136 can determine if a load on the actuator 136 driving the deployment exceeds a predetermined threshold. For example, the galley controller 402 and/or flange 132 can determine if the current (e.g., amperes) demanded by the actuator 136 exceeds a predetermined threshold. The load on the actuator 136 may be too great if the deployment path of the housing 112 is obstructed (e.g., a user is sitting on the deployable galley unit 100).

If the galley controller 402, boat controller 404, and/or actuator 136 determine that the load (e.g., current demand) exceeds the threshold, the process can proceed block 506 and stop deployment of the housing 112. In some configurations, the display(s) 426, light(s) 414, speaker(s) 428, display(s) 432, speaker(s) 434, light(s) 436, display(s) 440, speaker(s) 442, and/or speaker(s) 442 can indicate an alert and/or status to the user. The process can optionally proceed to block 508 and automatically stow the housing 112.

If the galley controller 402, boat controller 404, and/or actuator 136 determine that the load (e.g., current demand) does not exceed the threshold, the process can proceed block 510 and determine if the housing 112 has reached the final deployed position and/or indicated position by the user, which can be determined with one or more sensors or timers. If the galley controller 402, boat controller 404, and/or actuator 136 determine that the housing 112 has not reached the final deployed position and/or indicated position by the user, the process can return to block 504. If the galley controller 402, boat controller 404, and/or actuator 136 determine that the housing 112 has reached the final deployed position and/or indicated position by the user, the process can proceed to block 512 and stop deployment of the housing 112.

Figure 10B:
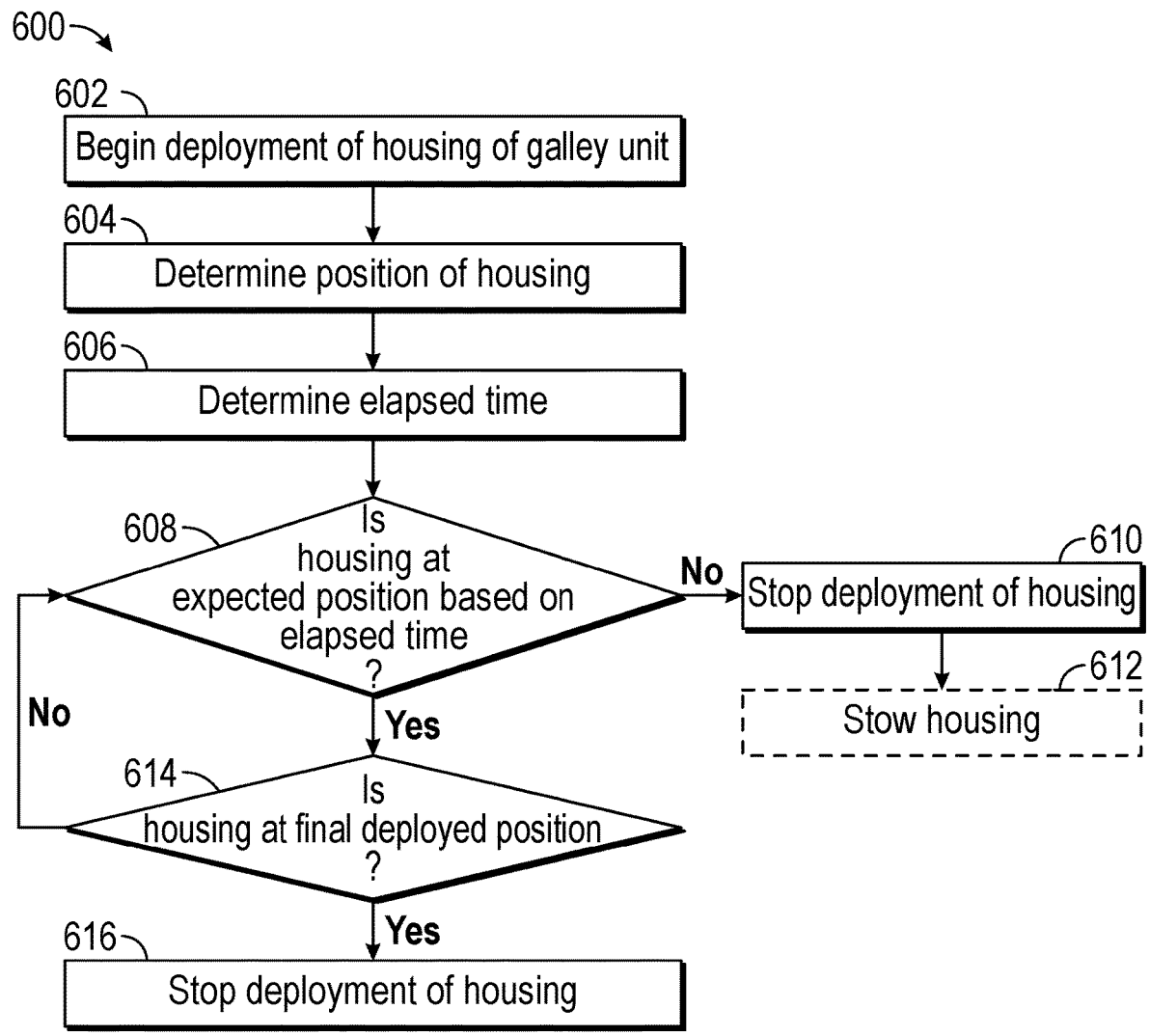
FIG. 10B illustrates another method of deploying the galley unit.

FIG. 10B illustrates another method 600 of deploying the housing 112 of the galley unit 100. Block 602 can be the same as block 502 described in reference to method 500. At block 604, the galley controller 402, boat controller 404, and/or actuator 136 can determine the position of the housing 112 with one or more sensors. At block 606, the galley controller 402, boat controller 404, and/or actuator 136 can determine how much time has elapsed since the beginning of deployment with one or more timers.

At block 608, galley controller 402, boat controller 404, and/or actuator 136 can determine if the housing 112 is at the expected position based on the elapsed time. If the galley controller 402, boat controller 404, and/or actuator 136, determines that the housing 112 is not at the expected position based on the elapsed time, the process can proceed to block 610 and stop deployment of the housing 112. In some configurations, the display(s) 426, light(s) 414, speaker(s) 428, display(s) 432, speaker(s) 434, light(s) 436, display(s) 440, speaker(s) 442, and/or speaker(s) 442 can indicate an alert and/or status to the user. The process can optionally proceed to block 508 and automatically stow the housing 112.

If the galley controller 402, boat controller 404, and/or actuator 136, determines that the housing 112 is at the expected position based on the elapsed time, the process can proceed to block 614 and determine if the housing 112 is at the final deployed positon and/or indicated position by the user. If the galley controller 402, boat controller 404, and/or actuator 136, determines that the housing 112 is not at the final deployed positon and/or indicated position by the user, the process can return to block 608. If the galley controller 402, boat controller 404, and/or actuator 136, determines that the housing 112 is at the final deployed positon and/or indicated position by the user, the process can proceed to block 616 and stop deployment of the housing 112.

Figure 11A:
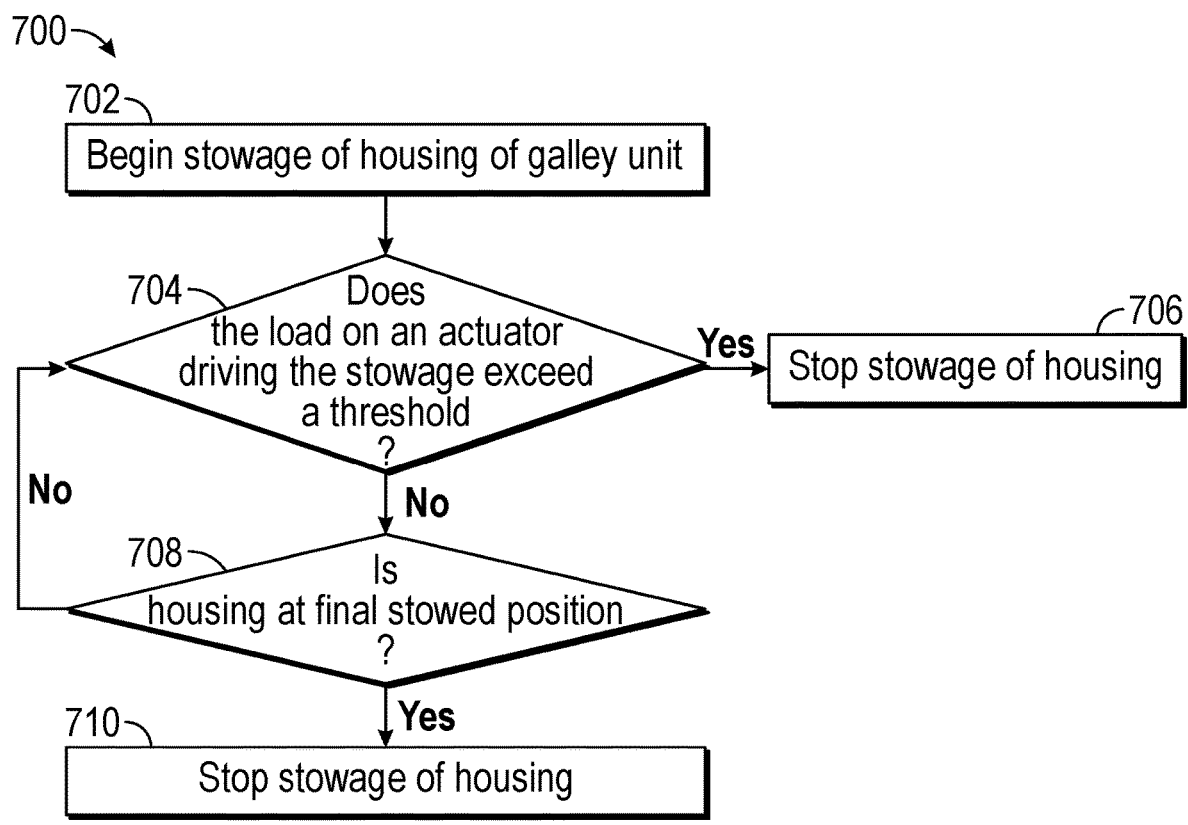
FIG. 11A illustrates a method of stowing the galley unit.

FIG. 11A illustrates a method 700 of stowing the housing 112 of the galley unit 100. At block 702, the actuator 136 can be activated to actuate the scissor lift assembly 134 to lower the housing 112. For example, the shaft 148 of the actuator 136 can be extended, pushing the second cross support 160 away from the actuator 136 such that the ends of the plurality of arms move farther apart from each other to lower the housing 112. The actuator 136 can receive the command to stow from the user interface(s) 408 (e.g., momentary switch) that can be disposed at the locations described herein, the user interface(s) 430 of the boat (e.g., dashboard controls), and/or user interface(s) 438 of the user's portable device. At block 704, the galley controller 402, boat controller 404, and/or actuator 136 can determine if a load on the actuator 136 driving the stowage exceeds a predetermined threshold. For example, the galley controller 402 and/or flange 132 can determine if the current (e.g., amperes) demanded by the actuator 136 exceeds a predetermined threshold. The load on the actuator 136 may exceed the threshold if the stowage path of the housing 112 is obstructed.

If the galley controller 402, boat controller 404, and/or actuator 136 determine that the load (e.g., current demand) exceeds the threshold, the process can proceed block 706 and stop stowage of the housing 112. In some configurations, the display(s) 426, light(s) 414, speaker(s) 428, display(s) 432, speaker(s) 434, light(s) 436, display(s) 440, speaker(s) 442, and/or speaker(s) 442 can indicate an alert and/or status to the user.

If the galley controller 402, boat controller 404, and/or actuator 136 determine that the load (e.g., current demand) does not exceed the threshold, the process can proceed block 708 and determine if the housing 112 has reached the final stowed position and/or indicated position by the user. If the galley controller 402, boat controller 404, and/or actuator 136 determine that the housing 112 has not reached the final stowed position and/or indicated position by the user, the process can return to block 704. If the galley controller 402, boat controller 404, and/or actuator 136 determine that the housing 112 has reached the final deployed position and/or indicated position by the user, the process can proceed to block 710 and stop stowage of the housing 112.

Figure 11B:
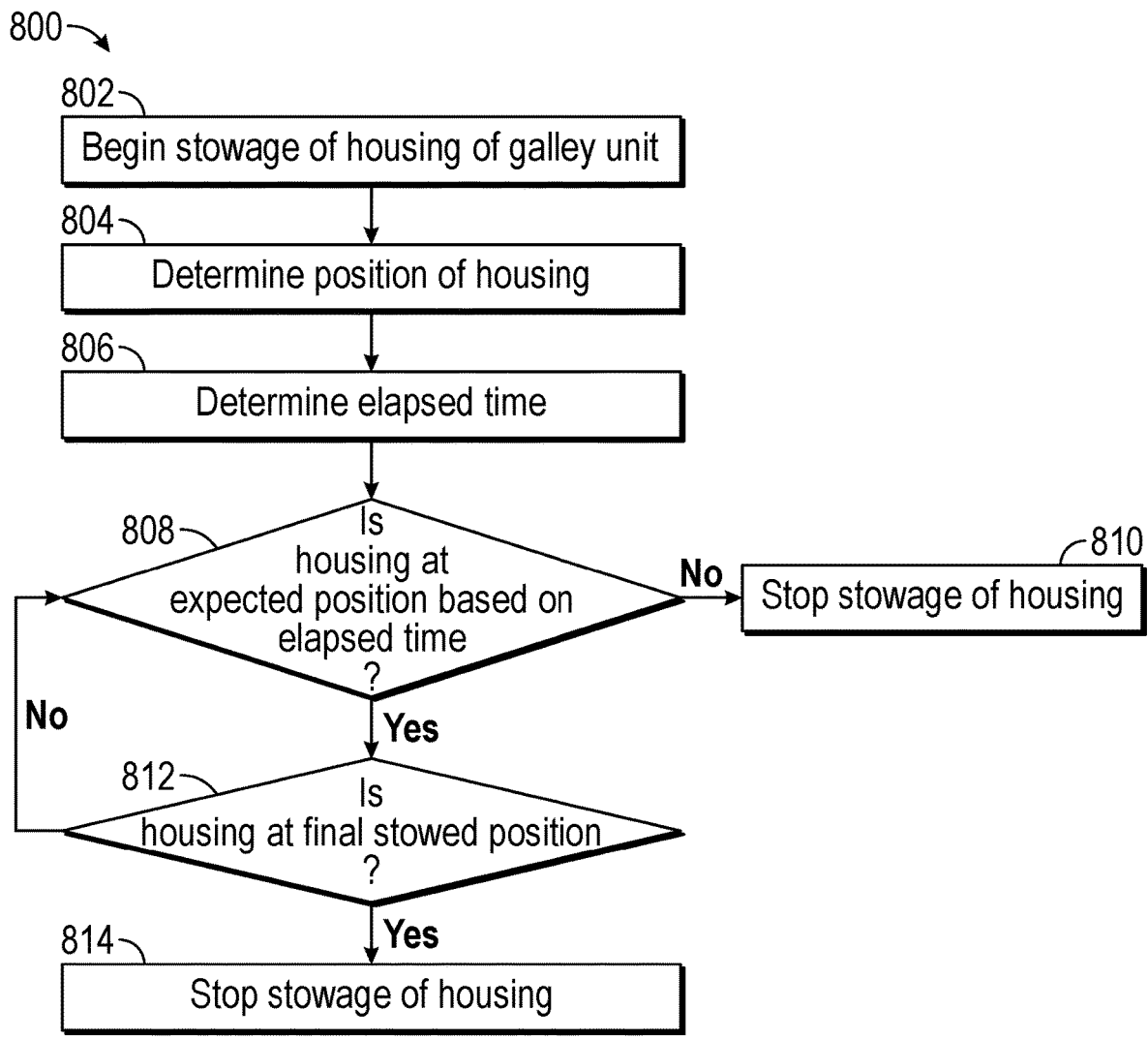
FIG. 11B illustrates another method of stowing the galley unit.

FIG. 11B illustrates another method 800 of stowing the housing 112 of the galley unit 100. Block 802 can be the same as block 702 described in reference to method 700. At block 804, the galley controller 402, boat controller 404, and/or actuator 136 can determine the position of the housing 112. At block 806, the galley controller 402, boat controller 404, and/or actuator 136 can determine how much time has elapsed since the beginning of stowage.

At block 808, galley controller 402, boat controller 404, and/or actuator 136 can determine if the housing 112 is at the expected position based on the elapsed time. If the galley controller 402, boat controller 404, and/or actuator 136, determines that the housing 112 is not at the expected position based on the elapsed time, the process can proceed to block 810 and stop deployment of the housing 112. In some configurations, the display(s) 426, light(s) 414, speaker(s) 428, display(s) 432, speaker(s) 434, light(s) 436, display(s) 440, speaker(s) 442, and/or speaker(s) 442 can indicate an alert and/or status to the user.

If the galley controller 402, boat controller 404, and/or actuator 136, determines that the housing 112 is at the expected position based on the elapsed time, the process can proceed to block 812 and determine if the housing 112 is at the final deployed positon and/or indicated position by the user. If the galley controller 402, boat controller 404, and/or actuator 136, determine that the housing 112 is not at the final stowed positon and/or indicated position by the user, the process can return to block 808. If the galley controller 402, boat controller 404, and/or actuator 136, determines that the housing 112 is at the final stowed positon and/or indicated position by the user, the process can proceed to block 814 and stop stowage of the housing 112.

Terminology

Although this disclosure has been described in the context of certain embodiments and examples, a person of ordinary skill in the art would recognize, after reviewing the disclosure herein, that any embodiment disclosed can be combined with other embodiments, portions/aspects of other embodiments, and/or technologies known in the art to accomplished the desired advantages discussed herein. It will be understood by those skilled in the art, after reviewing the disclosure herein, that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art after reviewing the disclosure herein. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Reference is made to watercraft and boats herein. However, one of ordinary skill in the art, after reviewing the disclosure herein, will understand that the galley unit(s) and associated components described herein can be implemented into other environments, such as campers, RVs, camper vans, trailers, kitchens, permanent living spaces (e.g., apartments, condos, single family homes, etc.), and/or others.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate after reviewing the disclosure herein that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize, after reviewing the disclosure herein, that the disclosure may be embodied or carried out in a manner that achieves one advantage or a group of advantages as taught herein without necessarily achieving other advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "and/or" has similar meaning in that when used, for example, in a list of elements, the term "and/or" means one, some, or all of the elements in the list, but does not require any individual embodiment to have all elements.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Values and ranges of values disclosed herein are examples and should not be construed as limiting. The values and ranges of values disclosed herein can be altered while gaining the advantages discussed herein. The listed ranges of values disclosed herein can include subsets of ranges or values which are part of this disclosure. Disclosed ranges of values or a single value for one feature can be implemented in combination with any other compatible disclosed range of values or value for another feature. For example, any specific value within a range of dimensions for one element can be paired with any specific value within a range of dimensions for another element. One of ordinary skill in the art will recognize from the disclosure herein that any disclosed length of a spar may be combined with any disclosed width of a foil, each having any disclosed shape.

Any methods disclosed herein need not be performed in the order recited. The methods disclosed herein include certain actions taken by a practitioner; however, they can also include any third-party instruction of those actions, either expressly or by implication. For example, actions such as "controlling a motor speed" include "instructing controlling of a motor speed."

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Additionally, all publications, patents, and patent applications mentioned in this specification are herein incorporated by reference to the same extent as if each individual publication, patent, or patent application was specifically and individually indicated to be incorporated by reference.

What is claimed is:

1. A deployable galley unit for a boat, the deployable galley unit comprising:
    a housing configured to be stowed within and vertically deployed out of an opening of a frame disposed on a deck of a boat such that a top horizontal portion of the housing comprising one or more features for preparing consumables is positioned higher than the frame;
    a seat covering configured to cover the top horizontal portion of the housing such that a user can sit on the housing when stowed within the frame; and
    a scissor lift assembly comprising a plurality of arms rotatably coupled to each other and a linear actuator having a shaft, the plurality of arms comprising a first arm, a second arm, a third arm, and a fourth arm, the first and the second arms rotatably coupled to the frame and slidably coupled to the housing, the third and the fourth arms rotatably coupled to the housing and slidably coupled to the frame, wherein the shaft of the linear actuator is coupled to ends of the third and the fourth arms that are slidably coupled to the frame such that an extension or retraction of the shaft causes the scissor lift assembly to vertically lower the housing straight down into the frame or vertically raise the housing straight out of the frame.

2. The deployable galley unit of claim 1, further comprising a carriage and a vertically-oriented track having one or more rails, the carriage coupled to the housing and slidably coupled to the one or more rails of the vertically-oriented track, and the vertically-oriented track coupled to the frame.

3. The deployable galley unit of claim 1, wherein the frame comprises one or more posts configured to support the housing when stowed within the frame.

4. The deployable galley unit of claim 1, further comprising a tray configured to hold a hose for supplying fluid to a spout, the tray pivotably coupled to the frame and slidably coupled to the housing.

5. The deployable galley unit of claim 1, wherein each of the plurality of arms comprises a first arm member and a second arm member.

6. The deployable galley unit of claim 1, further comprising a cross support rotatably coupled to middle portions of the plurality of arms.

7. The deployable galley unit of claim 6, further comprising a second cross support rotatably coupled to bottom portions of the third and the fourth arms, the shaft coupled to the second cross support.

8. The deployable galley unit of claim 7, wherein the second cross support comprises a first shaft and a second shaft, the first shaft comprising a flange, and the second shaft comprising a pair of flanges with a gap therebetween, wherein the flange of the first shaft is configured to be placed in the gap between the pair of flanges of the second shaft.

9. The deployable galley unit of claim 7, further comprising a third cross support coupled to top portions of the first and the second arms.

10. The deployable galley unit of claim 1, wherein an underside of the seat covering comprises a surface configured to reflect heat.

11. The deployable galley unit of claim 1, wherein the linear actuator is rotatably coupled to the frame.

12. The deployable galley unit of claim 1, wherein the linear actuator is controlled by a momentary switch.

13. The deployable galley unit of claim 1, further comprising a stove disposed on a top portion of the housing.

14. A deployable galley unit for a boat, the deployable galley unit comprising:
- a housing configured to be stowed within and vertically deployed out of an opening of a frame disposed on a deck of a boat such that a top horizontal portion of the housing is positioned higher than the frame;
- a seat covering configured to cover the top horizontal portion of the housing such that a user can sit on the housing when stowed within the frame; and
- a scissor lift assembly comprising a plurality of arms rotatably coupled to each other and a linear actuator having a shaft coupled to at least one of the plurality of arms, the plurality of arms arranged in a crossed arrangement, wherein a retraction of the shaft causes ends of the plurality of arms to move closer together to vertically raise the housing out of the frame.

15. The deployable galley unit of claim 14, wherein the top horizontal portion comprises a sink.

16. The deployable galley unit of claim 14, further comprising a carriage and a vertically-oriented track having one or more rails, the carriage coupled to the housing and slidably coupled to the one or more rails of the vertically-oriented track, and the vertically-oriented track coupled to the frame.

17. The deployable galley unit of claim 14, the plurality of arms comprising a first arm, a second arm, a third arm, and a fourth arm, the first and the second arms rotatably coupled to the frame and slidably coupled to the housing, the third and the fourth arms rotatably coupled to the housing and slidably coupled to the frame.

18. The deployable galley unit of claim 17, wherein the housing comprises rails and the frame comprises rails, the first and second arms slidably coupled to the rails of the housing, and the third and fourth arms slidably coupled to the rails of the frame.

19. A deployable galley unit, the deployable galley unit comprising:
- a housing comprising a top horizontal portion with one or more features for preparing consumables, the housing configured to be stowed within a base disposed on a deck of a boat and deployed out of an opening of the base for use;
- a seat covering configured to cover the top portion of the housing such that a user can sit on the housing when stowed within the base; and
- an actuator configured to vertically raise the housing with the top horizontal portion straight up out of the base to position the top horizontal portion higher than the base such that the user can utilize the one or more features for preparing consumables while standing.

20. The deployable galley unit of claim 19, further comprising a scissor lift manipulated by the actuator to move the housing between a stowed configuration and a deployed configuration.

21. The deployable galley unit of claim 19, further comprising a spout and a fluid conduit fluidically coupled to the spout, the fluid conduit comprising a slack section that is tightened as the housing is deployed.

22. The deployable galley unit of claim 21, wherein the fluid conduit is a first fluid conduit and further comprising a second fluid conduit, the second fluid conduit fluidically coupled to a sink to drain fluids from the sink.

23. The deployable galley unit of claim 19, further comprising a heating element and a conduit configured to power the heating element, the conduit comprising a slack section that is tightened as the housing is deployed.

24. The deployable galley unit of claim 19, wherein the top horizontal portion comprises a sink.

25. The deployable galley unit of claim 19, wherein the top horizontal portion comprises a stove.

* * * * *